US011100680B2

United States Patent
Kenney et al.

(10) Patent No.: US 11,100,680 B2
(45) Date of Patent: Aug. 24, 2021

(54) AR/VR/MR RIDE SHARING ASSISTANT

(71) Applicant: TOYOTA JIDOSHA KABUSHIKI KAISHA, Toyota (JP)

(72) Inventors: John Kenney, Mountain View, CA (US); Gaurav Bansal, Mountain View, CA (US); Hongsheng Lu, Mountain View, CA (US)

(*) Notice: Subject to any disclaimer, the term of this patent is extended or adjusted under 35 U.S.C. 154(b) by 25 days.

(21) Appl. No.: 16/184,285

(22) Filed: Nov. 8, 2018

(65) Prior Publication Data
US 2020/0151916 A1 May 14, 2020

(51) Int. Cl.
*G06T 11/00* (2006.01)
*G01S 19/03* (2010.01)
*G01C 21/34* (2006.01)

(52) U.S. Cl.
CPC .......... *G06T 11/00* (2013.01); *G01C 21/3438* (2013.01); *G01S 19/03* (2013.01)

(58) Field of Classification Search
CPC ....... G06T 11/00; G06T 19/006; G06T 11/60; G01S 19/03; G01C 21/3438; G01C 21/362; G01C 21/3647; G08G 1/123; G06Q 50/30; G06Q 30/0645; G06K 9/00671; G06F 16/29; H04W 4/021; H04W 4/023; H04W 4/027; H04W 4/029; H04W 4/40; H04W 4/70; H04W 4/80
See application file for complete search history.

(56) References Cited

U.S. PATENT DOCUMENTS

| | | | |
|---|---|---|---|
| 2012/0218125 A1* | 8/2012 | Demirdjian | G08G 1/164 340/905 |
| 2016/0063484 A1* | 3/2016 | Carpenter | G06Q 20/354 705/41 |
| 2016/0109940 A1* | 4/2016 | Lyren | H04W 4/023 463/2 |
| 2017/0153714 A1* | 6/2017 | Gao | G06F 3/017 |
| 2017/0252256 A1* | 9/2017 | Henshue | A61H 3/061 |
| 2018/0068505 A1* | 3/2018 | Mullett | G05D 1/0022 |
| 2018/0089899 A1* | 3/2018 | Piemonte | G02B 27/017 |
| 2018/0365893 A1* | 12/2018 | Mullins | G06T 19/003 |
| 2018/0374032 A1* | 12/2018 | Pan | G06Q 10/083 |
| 2019/0017839 A1* | 1/2019 | Eyler | G01C 21/3638 |
| 2019/0050758 A1* | 2/2019 | Kyllmann | G06Q 10/047 |
| 2019/0095729 A1* | 3/2019 | Dai | G02B 27/01 |

(Continued)

*Primary Examiner* — Chante E Harrison
(74) *Attorney, Agent, or Firm* — Burbage Law, P.C.; Jon-Michael Burbage; Elizabeth Ruzich

(57) ABSTRACT

The disclosure includes embodiments for providing augmented graphical data on a user device. In some embodiments, a method includes receiving, by the user device, a Vehicle-to-Everything (V2X) wireless message transmitted by a ride share vehicle and including V2X data describing the ride share vehicle. The method includes generating augmented graphical data based on the V2X data, where the augmented graphical data describes an augmented version of an image captured by the user device and depicting a real-life environment that includes the ride share vehicle, where the augmented version highlights a position of the ride share vehicle within the real-life environment. The method includes presenting the augmented graphical data on the user device so that the ride share vehicle is more easily located in the real-life environment.

20 Claims, 13 Drawing Sheets

(56) References Cited

U.S. PATENT DOCUMENTS

| | | | |
|---|---|---|---|
| 2019/0146219 A1* | 5/2019 | Rodriguez, II | G02B 27/017 |
| | | | 345/633 |
| 2019/0188495 A1* | 6/2019 | Zhao | G06K 9/6202 |
| 2019/0206258 A1* | 7/2019 | Chang | G01C 21/3438 |
| 2020/0284607 A1* | 9/2020 | Mangal | G06K 9/00791 |

* cited by examiner

AR/VR/MR RIDE SHARING ASSISTANT

BACKGROUND

The specification relates to providing a ride share service. In particular, the specification relates to generating an Augmented Reality (AR)/Virtual Reality (VR)/Mixed Reality (MR) output to assist a user to locate a ride share vehicle that provides the ride share service.

Ride share applications (e.g., Uber, Lyft, etc.) are becoming increasingly popular. One problem with existing ride sharing applications is that it can be difficult for a ride share passenger to locate a ride share vehicle when the ride share vehicle is located in a cluster of other vehicles. For example, assume that a ride share vehicle is used to provide a ride share service to a ride share passenger (e.g., a user of an existing ride sharing application). The ride share vehicle attempts to pick up the ride share passenger at an airport or any other location where ride share vehicles are used; the ride share vehicle is near the ride share passenger, but the ride share passenger struggles to find the ride share vehicle because it is located in a cluster of other vehicles (e.g., the ride share vehicle is surrounded by other vehicles).

An existing ride share application may provide the ride share passenger with the following information for the ride share vehicle: (1) the ride share vehicle's make; (2) the ride share vehicle's model; (3) the ride share vehicle's license plate number; (4) a headshot image of a driver of the ride share vehicle; and (5) an image of a map that depicts a drawing of the ride share vehicle as it travels closer to the location of the ride share passenger. Using this information, the ride share passenger is expected to search for the ride share vehicle in a public place. However, this information is not a convenient or customer-friendly way for the ride share passenger to locate the ride share vehicle when the ride share vehicle is located in a cluster of other vehicles. This approach also takes a lot of time and causes anxiety for a user who does not want to worry about whether he/she will be able to find the ride share vehicle on a crowded street while he/she waits on a busy sidewalk. Moreover, in some situations, the ride share passenger is located at a curb, and the ride share vehicle is unable to reach the curb due to traffic congestion (e.g., airports are common scenarios where this occurs, but other scenarios are possible), thereby creating an unsafe situation where the ride share passenger has to walk in the street in order to look for the ride share vehicle or otherwise cancel the ride share service and order another vehicle.

SUMMARY

Described are embodiments of a ride share assistant that is installed in a user device of a ride share passenger and a ride share client that is installed in an Electronic Control Unit (ECU) of a ride share vehicle. The ride share assistant and the ride share client cooperate with one another to make it easier for the ride share passenger to find the ride share vehicle in situations when the ride share vehicle is difficult to identify among many other vehicles, or in any other situation where the ride share passenger may struggle to locate the ride share vehicle.

In some embodiments, the ride share client and the ride share assistant communicate with one another via Vehicle-to-Everything (V2X) communication. The ride share client causes the ride share vehicle's V2X radio to transmit a V2X wireless message to the ride share passenger's user device (e.g., a smartphone). This V2X wireless message includes digital data that describes a geographic location of the ride share vehicle. The user device generates digital data describing a geographic location of the user device. The ride share assistant is either a stand-alone ride share application (similar to Uber or Lyft) or a plug-in or module of an existing ride share application.

The ride share assistant uses an electronic display of the user device to generate an AR/VR/MR output that depicts images of an environment of the user device (or an environment of the ride share passenger) and highlights, within this environment, the location of the ride share vehicle. For example, the ride share passenger is looking for the ride share vehicle. The ride share passenger holds his/her smartphone up like he/she is going to take an image of the environment. As he/she does this, a camera of his/her smartphone captures image data and a display of the smartphone depicts a real-time real-life image of the ride share passenger's environment. The ride share vehicle is located within this environment. The image displayed on the smartphone is modified by the ride share assistant to highlight the location of the ride share vehicle within the environment. For example, the image is black and white, but the ride share vehicle is in color. Many other variations for highlighting the location of the ride share vehicle are possible, including for example, graphical overlays that highlight the location of the ride share vehicle. The image is updated in real time or near real time as objects in the environment move or an orientation of the smartphone changes (e.g., the ride share passenger's hand moves).

In some embodiments, the ride share assistant receives the following inputs and outputs the image(s) displayed by the electronic display of the user device based on these inputs: (1) the digital data describing the geographic location of the ride share vehicle; (2) the digital data describing the geographic location of the user device; (3) camera data describing the image of the environment of the ride share vehicle; and (4) sensor data describing an orientation or a change in the orientation of the display of the user device.

In some embodiments, a roadside unit (RSU) relays V2X communications between the ride share client and the ride share assistant.

There is no existing solution that uses AR/VR/MR content to help ride share passengers locate a ride share vehicle. Instead, some existing solutions provide a ride share passenger with rudimentary information and expect the ride share passenger to locate the ride share vehicle manually. For example, an existing solution may provide the ride share passenger with an image of a map of a current environment that depicts (1) the ride share passenger's location in the environment and (2) a drawing of the vehicle that shows the vehicle getting closer to the location of the ride share passenger as time passes. However, this map is not AR/VR/MR content and does not depict actual images of the environment. Instead, everything depicted by the map is a drawing, and not an image of the actual world. By comparison, in some embodiments described herein the ride share assistant uses a camera of the user device of the ride share passenger to capture images of the actual environment. The display of the user device depicts these images as they are captured in real time. When the ride share vehicle appears in the images, the appearance of the ride share vehicle is modified in some way so that the ride share passenger is able to discern that the vehicle depicted in the images is his/her ride share vehicle. Other embodiments are possible. This approach makes it quicker and less stressful for the ride share passenger to locate his/her ride share vehicle when compared to the existing solutions.

There is no existing solution that uses V2X communications to help ride share passengers locate a ride share vehicle. Instead, some existing solutions use a cloud server that stores a profile of the ride share vehicle including rudimentary information about the ride share vehicle as well as real-time data about the location of the ride share vehicle which is provided to the cloud server by a smartphone located inside the ride share vehicle and belonging to a driver of the ride share vehicle. The cloud server then uses WiFi or cellular communications to provide the rudimentary information to the smartphone of the ride share passenger. By comparison, a cloud server is not needed in embodiments described herein because V2X communications are exchanged from the ride share vehicle to the user device of the ride share passenger. This approach is quicker and easier to implement than the existing solutions.

Besides, there is no existing solution that uses onboard sensors of the ride share vehicle to help the ride share passenger locate the ride share vehicle. In some existing solutions, the location of the ride share vehicle in a map is determined by using a Global Positioning System (a "GPS" if referenced generally, or a "GPS unit" if in reference to a specific device) of a smartphone that is operated by the driver of the ride share vehicle. By comparison, in some embodiments described herein the ride share client uses the ride share vehicle's own onboard sensors to determine the location of the ride share vehicle.

An additional benefit of the ride share client and the ride share assistant described herein includes an advantage in location accuracy due to one or more of: (1) using onboard sensors of the ride share vehicle to determine the location of the ride share vehicle, compared with existing solutions that only have access to a position of a driver's smart phone; and (2) a low latency with which the location of the ride share vehicle is conveyed to the ride share assistant of the user device via V2X communication, compared to a higher latency when information propagates to the user device over a multi-layer cloud infrastructure.

For example, currently the ride share vehicle that uses V2X communications generally has a more accurate GPS unit than a smart phone used by a ride share driver. There are no requirements on the location accuracy of the driver's smart phone. By contrast, a V2X-equipped vehicle is likely to conform to an industry standard location accuracy requirement of 1.5 meters. Since in existing solutions a ride share passenger only has access to the position of the driver's smart phone, as relayed by a provider of a ride share application provider, a ride share service provided by existing solutions has a lower location accuracy than that provided by the ride share client and the ride share assistant described herein.

In another example, the ride share client and the ride share assistant described herein reduce latency of a position report to a ride share passenger, which also improves the passenger's ability to locate the approaching ride share vehicle.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: receiving, by a user device, a V2X wireless message transmitted by a ride share vehicle and including V2X data describing the ride share vehicle; generating augmented graphical data based on the V2X data, where the augmented graphical data describes an augmented version of an image captured by the user device and depicting a real-life environment that includes the ride share vehicle, where the augmented version highlights a position of the ride share vehicle within the real-life environment; and presenting the augmented graphical data on the user device so that the ride share vehicle is more easily located in the real-life environment. Other embodiments of this aspect include corresponding computer systems, apparatus, and computer programs recorded on one or more computer storage devices, each configured to perform the actions of the methods.

Implementations may include one or more of the following features. The method where the V2X data includes Dedicated Short Range Communication (DSRC)-compliant Global Positioning System (GPS) data of the ride share vehicle. The method further including: retrieving GPS data of the user device; retrieving camera data describing the image that depicts the real-life environment; and generating the augmented graphical data based on the DSRC-compliant GPS data of the ride share vehicle, the GPS data of the user device and the camera data. The method where the image is a real-time image captured by a camera sensor of the user device. The method where the augmented graphical data includes one of augmented-reality content, virtual-reality content and mixed-reality content, and the ride share vehicle on the augmented version of the image is augmented by computer-generated perceptual information. The method further including: retrieving sensor data describing an orientation of a display of the user device; and generating the augmented graphical data further based on the sensor data. The method where the V2X data further includes a first vehicle identifier (ID) that uniquely identifies the ride share vehicle and prior to generating the augmented graphical data, the method further including: retrieving the first vehicle ID from the V2X data; retrieving a second vehicle ID that uniquely identifies a vehicle designated to execute a ride share event associated with the user device from a vehicle ID database; and if the first vehicle ID matches the second vehicle ID, discerning that the ride share vehicle is the vehicle designated to execute the ride share event associated with the user device. The method where the first vehicle ID and the second vehicle ID are temporary unique identifiers. The method where if the ride share vehicle is not in line of sight but is within a V2X communication range of the user device, generating the augmented graphical data includes: superimposing a representation of the ride share vehicle on the real-life environment based on a geographic location of the ride share vehicle to form the augmented version of the image, so that the representation of the ride share vehicle is presented together with the real-life environment on the user device. The method where the V2X wireless message is selected from a group that consists of: a DSRC message; a Basic Safety Message; a Long-Term Evolution (LTE) message; a LTE-V2X message; a 5G-V2X message; and a millimeter wave message. The method where the ride share vehicle provides a ride share service to a user of the user device and the augmented graphical data assists the user to locate the ride share vehicle and receive the ride share service. Implementations of the described techniques may include hardware, a method or process, or computer software on a computer-accessible medium.

One general aspect includes a system including a processor and a non-transitory memory storing computer code which, when executed by the processor, causes the processor to: receive a V2X wireless message transmitted by a ride share vehicle and including V2X data describing the ride share vehicle; generate augmented graphical data based on the V2X data, where the augmented graphical data describes an augmented version of an image captured by a user device and depicting a real-life environment that includes the ride share vehicle, where the augmented version highlights a position of the ride share vehicle within the real-life environment; and present the augmented graphical data on the user device so that the ride share vehicle is more easily located in the real-life environment. Other embodiments of this aspect include corresponding computer systems, apparatus, and computer programs recorded on one or more computer storage devices, each configured to perform the actions of the methods.

Implementations may include one or more of the following features. The system where the V2X data includes DSRC-compliant GPS data of the ride share vehicle. The system where the computer code, when executed by the processor, causes the processor further to: retrieve GPS data of the user device; retrieve camera data describing the image that depicts the real-life environment; and generate the augmented graphical data based on the DSRC-compliant GPS data of the ride share vehicle, the GPS data of the user device and the camera data. The system where the image is a real-time image captured by a camera sensor of the user device. The system where the augmented graphical data includes one of augmented-reality content, virtual-reality content and mixed-reality content, and the ride share vehicle on the augmented version of the image is augmented by computer-generated perceptual information. The system where the computer code, when executed by the processor, causes the processor further to: retrieve sensor data describing an orientation of a display of the user device; and generate the augmented graphical data further based on the sensor data. Implementations of the described techniques may include hardware, a method or process, or computer software on a computer-accessible medium.

One general aspect includes a computer program product including a non-transitory memory storing computer-executable code that, when executed by a processor, causes the processor to: receive a V2X wireless message transmitted by a ride share vehicle and including V2X data describing the ride share vehicle; generate augmented graphical data based on the V2X data, where the augmented graphical data describes an augmented version of an image captured by a user device and depicting a real-life environment that includes the ride share vehicle, where the augmented version highlights a position of the ride share vehicle within the real-life environment; and present the augmented graphical data on the user device so that the ride share vehicle is more easily located in the real-life environment. Other embodiments of this aspect include corresponding computer systems, apparatus, and computer programs recorded on one or more computer storage devices, each configured to perform the actions of the methods.

Implementations may include one or more of the following features. The computer program product where the V2X data includes DSRC-compliant GPS data of the ride share vehicle. The computer program product where the computer-executable code, when executed by the processor, causes the processor further to: retrieve GPS data of the user device; retrieve camera data describing the image that depicts the real-life environment; and generate the augmented graphical data based on the DSRC-compliant GPS data of the ride share vehicle, the GPS data of the user device and the camera data. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
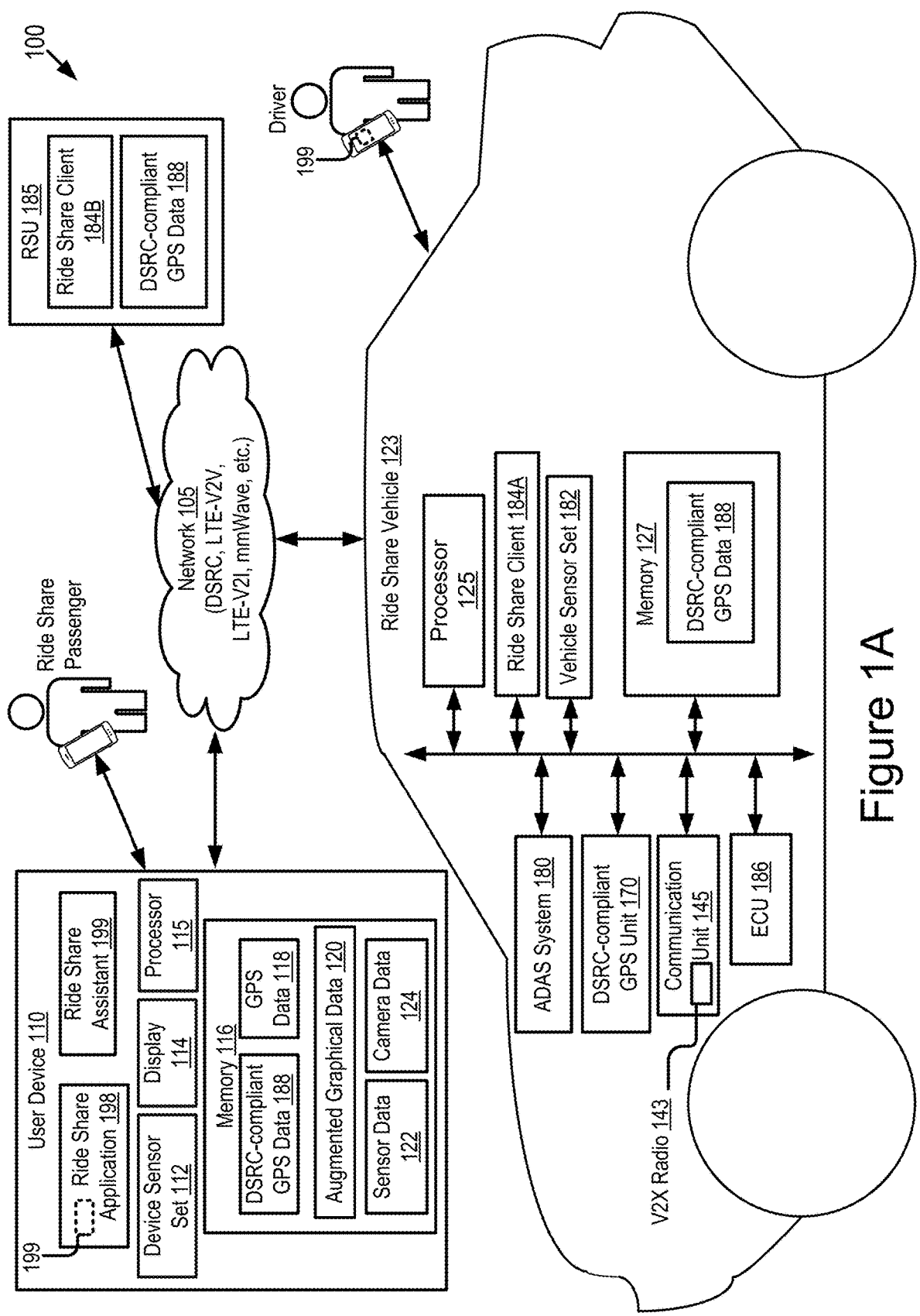
FIG. 1A is a block diagram illustrating an operating environment for a ride share client and a ride share assistant according to some embodiments.

Embodiments of a ride share assistant installed in a user device and a ride share client installed in a ride share vehicle that cooperate with one another to generate an AR/VR/MR output for assisting a ride share passenger to locate the ride share vehicle are now described. The ride share client and the ride share assistant communicate with one another via V2X communications. Examples of V2X communications described herein include one or more of the following: DSRC (including Basic Safety Messages (BSMs) and Personal Safety Messages (PSMs), among other types of DSRC communication); LTE; millimeter wave communication; 3G; 4G; 5G-V2X; LTE-V2X; LTE-Vehicle-to-Vehicle (LTE-V2V); LTE-Device-to-Device (LTE-D2D); Voice over LTE (VoLTE); etc.

In some embodiments, the ride share vehicle that includes the ride share client is a DSRC-equipped vehicle. A DSRC-equipped vehicle is a vehicle which: (1) includes a DSRC radio; (2) includes a DSRC-compliant GPS unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. DSRC has a range of substantially 500 meters and is designed to be compatible for wirelessly sending and receiving messages among mobile nodes such as vehicles and Roadside Units ("RSU" if singular, "RSUs" if plural). A DSRC-compliant GPS unit is operable to provide positional information for a vehicle (or some other DSRC-equipped device that includes the DSRC-compliant GPS unit) that has lane-level accuracy.

For simplicity and convenience of description, a wireless message described herein may be referred to as a V2X wireless message. An example of the V2X wireless message is a DSRC message that includes wireless vehicle data. There are many types of DSRC messages. One type of DSRC messages is known as a Basic Safety Message ("BSM" or a "BSM message"). DSRC-equipped vehicles broadcast a BSM at a regular interval. The interval may be user adjustable. In some embodiments, the interval may be once every 0.10 seconds.

A BSM includes BSM data. The BSM data describes attributes of the vehicle that originally transmitted the BSM. The BSM data describes, among other things, one or more of the following: (1) the path history of the vehicle that transmits the BSM; (2) the speed of the vehicle that transmits the BSM; and (3) the GPS data describing a location of the vehicle that transmits the BSM.

As used herein, the words "geographic location," "location," "geographic position" and "position" refer to a latitude and longitude of an object (or, a latitude, longitude and elevation of an object) such as the ride share vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

For example, an approaching ride share vehicle may be above or below an elevation of a ride share passenger, and embodiments described herein can use elevation information received from the DSRC-equipped vehicle to accurately position an AR view of the approaching ride share vehicle on a user device of the ride share passenger. By comparison, a ride share application provider typically does not convey elevation information of the approaching ride share vehicle to the ride share passenger.

In some embodiments, a V2X wireless message transmitted by the ride share vehicle includes V2X data describing the ride share vehicle. For example, the V2X data includes the wireless vehicle data described above. Additionally, any of the data generated by the ride share vehicle may be included in a V2X wireless message transmitted by the ride share vehicle, and so, this data too may be examples of the V2X data according to some embodiments.

Example Overview

Referring to FIG. 1A, depicted is an operating environment 100 for a ride share assistant 199 and a ride share client 184 (here, a ride share client 184A and a ride share client 184B may be referred to collectively or individually as the "ride share client 184" since for example, the ride share client 184A and the ride share client 184B may provide similar functionality).

The operating environment 100 may include one or more of the following elements: a ride share vehicle 123; a RSU 185; and a user device 110. These elements of the operating environment 100 may be communicatively coupled to a network 105. The RSU 185 may be DSRC-enabled and may relay wireless messages among the ride share vehicle 123 and the user device 110 via the network 105. For example, the range of DSRC transmissions is generally about 500 meters, and so, if the user device 110 is 700 meters away from the ride share vehicle 123, then one or more intervening DSRC-enabled RSUs may relay a DSRC message from the user device 110 to the ride share vehicle 123 or from the ride share vehicle 123 to the user device 110.

Although one ride share vehicle 123, one RSU 185, one user device 110 and one network 105 are depicted in FIG. 1A, in practice the operating environment 100 may include one or more ride share vehicles 123, one or more RSUs 185, one or more user devices 110 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2I, LTE-V2X, LTE-D2D, VoLTE, 5G-V2X or any other mobile data network or combination of mobile data networks. Further, the network 105 may include one or more IEEE 802.11 wireless networks.

In some embodiments, one or more of the ride share vehicle 123, the RSU 185 and the user device 110 may be DSRC-equipped devices. The network 105 may include one or more communication channels shared among the ride share vehicle 123, the user device 110 and the RSU 185. The communication channel may include DSRC, LTE-V2X, full-duplex wireless communication or any other wireless communication protocol. For example, the network 105 may be used to transmit a DSRC message, DSRC probe or BSM including any of the data described herein.

The ride share vehicle 123 may be any type of vehicle. For example, the ride share vehicle 123 may include one of the following types of vehicles: a car; a truck; a sports utility vehicle; a bus; a semi-truck; a drone or any other roadway-based conveyance.

In some embodiments, the ride share vehicle 123 may include an autonomous vehicle or a semi-autonomous vehicle. For example, the ride share vehicle 123 may include an Advanced Driver-Assistance System (ADAS) 180. The ADAS system 180 may provide some or all of the functionality that provides autonomous functionality.

The ride share vehicle 123 is operated by a driver to provide a ride share service to a ride share passenger. As depicted in FIG. 1A, the driver may carry a user device (e.g., a smartphone), and interact with a ride share application 198 installed in the user device. Optionally, a ride share assistant 199 is installed in the user device carried by the driver.

The ride share vehicle 123 may include one or more of the following elements: a processor 125; a memory 127; a communication unit 145; a DSRC-compliant GPS unit 170; the ADAS system 180; a vehicle sensor set 182; an ECU 186 and the ride share client 184. These elements of the ride share vehicle 123 may be communicatively coupled to one another via a bus.

In some embodiments, the processor 125 and the memory 127 may be elements of an onboard vehicle computer system. The onboard vehicle computer system may be operable to cause or control the operation of the ride share client 184. The onboard vehicle computer system may be operable to access and execute the data stored on the memory 127 to provide the functionality described herein for the ride share client 184.

The processor 125 includes an arithmetic logic unit, a microprocessor, a general purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ride share vehicle 123 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The ride share vehicle 123 may include one or more memories 127.

The memory 127 of the ride share vehicle 123 may store digital data describing a geographic location of the ride share vehicle 123 (e.g., DSRC-compliant GPS data 188).

The DSRC-compliant GPS data 188 describes the geographic location of the ride share vehicle 123. For example, the DSRC-compliant GPS data 188 describes a longitude and latitude of the ride share vehicle 123.

In some embodiments, the DSRC-compliant GPS data 188 may be retrieved by the DSRC-compliant GPS unit 170 of the ride share vehicle 123 that is operable to provide GPS data describing the geographic location of the ride share vehicle 123 with lane-level accuracy. For example, the ride share vehicle 123 is traveling in a lane of a roadway. Lane-level accuracy means that the location of the ride share vehicle 123 is described by the GPS data so accurately that the lane of travel of the ride share vehicle 123 within the roadway may be accurately determined based on the GPS data for this ride share vehicle 123 as provided by the DSRC-compliant GPS unit 170. In some embodiments, the DSRC-compliant GPS data 188 is an element of the BSM data or the PSM data.

The communication unit 145 transmits and receives data to and from a network 105 or to another communication channel. In some embodiments, the communication unit 145 may include a DSRC transceiver, a DSRC receiver and other hardware or software necessary to make the ride share vehicle 123 a DSRC-enabled device. For example, the communication unit 145 includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes any type of V2X communication antenna necessary to support one or more of the following V2X communication protocols: DSRC; mmWave; LTE-V2X; LTE-D2D; 5G-V2X; ITS-G5; ITS-Connect; LPWAN; visible light communication; television white space; Bluetooth; Wi-Fi, etc. The communication unit 145 includes a V2X radio 143. In some embodiments, the ride share client 184 includes code and routines that are operable to control the operation of the V2X radio 143 and cause the V2X radio 143 to transmit a V2X wireless message that includes the DSRC-compliant GPS data 188 of the ride share vehicle 123.

The V2X radio 143 is an electronic device that includes a V2X transmitter and a V2X receiver and is operable to send and receive wireless messages via any V2X protocol. For example, the V2X radio 143 is operable to send and receive wireless messages via DSRC. The V2X transmitter is operable to transmit and broadcast DSRC messages over the 5.9 GHz band. The V2X receiver is operable to receive DSRC messages over the 5.9 GHz band. The V2X radio 143 includes multiple channels with at least one of these channels designated for sending and receiving BSMs and at least one of these channels designated for sending and receiving PSMs.

In some embodiments, the DSRC-compliant GPS unit 170 includes any hardware and software necessary to make the ride share vehicle 123 or the DSRC-compliant GPS unit 170 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 170 includes any hardware and software necessary to make the ride share vehicle 123 or the DSRC-compliant GPS unit 170 compliant with one or more of the following DSRC standards, including any derivative or fork thereof: IEEE 802.11; IEEE 1609.2; IEEE 1609.3; IEEE 1609.4; SAE J2735; SAE J2945/0; SAE J2945/1; etc.

In some embodiments, the DSRC-compliant GPS unit 170 is operable to provide GPS data describing the location of the ride share vehicle 123 with lane-level accuracy.

In some embodiments, the DSRC-compliant GPS unit 170 includes hardware that wirelessly communicates with a GPS satellite to retrieve GPS data that describes the geographic location of the ride share vehicle 123 with a precision that is compliant with the DSRC standard. The DSRC standard requires that GPS data be precise enough to infer if two vehicles (one of which is, for example, the ride share vehicle 123) are located in adjacent lanes of travel. In some embodiments, the DSRC-compliant GPS unit 170 is operable to identify, monitor and track its two-dimensional position within 1.5 meters of its actual position 68% of the time under an open sky. Since driving lanes are typically no less than 3 meters wide, whenever the two-dimensional error of the GPS data is less than 1.5 meters the ride share client 184 described herein may analyze the GPS data provided by the DSRC-compliant GPS unit 170 and determine what lane the ride share vehicle 123 is traveling in based on the relative positions of two or more different vehicles (one of which is, for example, the ride share vehicle 123) traveling on the roadway at the same time.

By comparison to the DSRC-compliant GPS unit 170, a conventional GPS unit which is not compliant with the DSRC standard is unable to determine the location of a vehicle with lane-level accuracy. For example, a typical roadway lane is approximately 3 meters wide. However, a conventional GPS unit only has an accuracy of plus or minus 10 meters relative to the actual location of the vehicle. As a result, such conventional GPS units are not sufficiently accurate to identify a lane of travel for a vehicle based on GPS data alone; instead, systems having only conventional GPS units must utilize sensors such as cameras to identify the lane of travel of the vehicle. Identifying a lane of travel of a vehicle is beneficial, for example, because in some embodiments it may enable the ride share client 184 to more accurately identify a location of the ride share vehicle 123 traveling in a roadway having multiple lanes of travel.

For example, comparing with a GPS unit of a DSRC-equipped vehicle (conformant to SAE J2945/1, with the 1.5-meter accuracy requirement), a GPS unit of a non-DSRC vehicle which is not compliant with the DSRC standard is unable to determine the location of the vehicle with lane-level accuracy. In another example, comparing with a GPS unit of a DSRC-equipped vehicle, a GPS unit of a ride share driver's smart phone is also unable to determine the location of the vehicle with lane-level accuracy.

The ADAS system 180 may include one or more advanced driver assistance systems. Examples of the ADAS system 180 may include one or more of the following elements of the ride share vehicle 123: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the ADAS system 180 includes any hardware or software that controls one or more operations of the ride share vehicle 123 so that the ride share vehicle 123 is "autonomous" or "semi-autonomous."

The vehicle sensor set 182 includes one or more sensors that are operable to measure a roadway environment outside of the ride share vehicle 123. For example, the vehicle sensor set 182 may include one or more sensors that record one or more physical characteristics of the road environment that is proximate to the ride share vehicle 123. The memory 127 may store sensor data that describes the one or more physical characteristics recorded by the vehicle sensor set 182.

In some embodiments, the vehicle sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The ECU 186 is an embedded system in automotive electronics that controls one or more of electrical systems or subsystems in the ride share vehicle 123. Types of the ECU 186 include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the ride share vehicle 123 may include multiple ECUs 186. In some embodiments, the ride share client 184 may be an element of the ECU 186.

In some embodiments, the ride share client 184 includes software that is operable, when executed by the processor 125, to cause the processor 125 to execute one or more steps of a method 400 and example processes 500 and 600 described below with reference to FIGS. 4-6B. In some embodiments, the ride share client 184 determines that the ride share vehicle 123 is designated to execute a ride share event and acquires GPS data of the ride share vehicle 123 from a GPS unit of the ride share vehicle 123. For example, the ride share client 184 acquires DSRC-compliant GPS data of the ride share vehicle 123 from the DSRC-compliant GPS unit 170. The ride share client 184 generates a V2X wireless message including V2X data describing the ride share vehicle 123 (e.g., including the DSRC-compliant GPS data of the ride share vehicle 123), and transmits the V2X wireless message to the user device 110 or to the RSU 185 for relaying the V2X wireless message to the user device 110. In some embodiments, the V2X data may further include data describing a destination as the user device 110 so that the V2X wireless message is unicasted to the user device 110.

In some embodiments, the ride share client 184 acquires GPS data of the ride share vehicle 123 from a GPS unit of the ride share vehicle 123 (e.g., the ride share client 184 acquires DSRC-compliant GPS data of the ride share vehicle 123 from the DSRC-compliant GPS unit 170). The ride share client 184 constructs a V2X wireless message including V2X data, where the V2X data includes the DSRC-compliant GPS data and digital data (e.g., a vehicle identifier (ID)) used for identifying the ride share vehicle 123. The ride share client 184 transmits the V2X wireless message via the network 105. For example, the V2X wireless message may be broadcasted via the network 105.

In some embodiments, the ride share client 184 may be implemented using hardware including a field-programmable gate array ("FPGA") or an application-specific integrated circuit ("ASIC"). In some other embodiments, the ride share client 184 may be implemented using a combination of hardware and software. The ride share client 184 may be stored in a combination of the devices (e.g., servers or other devices), or in one of the devices.

In some embodiments, the RSU 185 relays V2X communications between the ride share client 184 and the ride share assistant 199. The RSU 185 includes an instance of the ride share client 184 (e.g., the ride share client 184B) for managing the relaying of V2X wireless messages among endpoints (e.g., the user device 110, the ride share vehicle 123, other vehicles or other endpoints) of the operating environment 100. For example, the RSU 185 may receive a V2X wireless message from the ride share vehicle 123, and then the ride share client 184 of the RSU 185 causes a processor of the RSU 185 to store the V2X wireless message (including the DSRC-compliant GPS data 188) in a memory of the RSU 185. The ride share client 184 of the RSU 185 may relay the V2X wireless message to the user device 110.

The user device 110 is a computing device that includes one or more processors and one or more memories. For example, the user device 110 may be one of the following elements: a smartphone; a laptop computer; a tablet computer; a music player; a video game player; a personal digital assistant (PDA); a portable controller; and any other portable electronic device. Other types of the user device 110 are possible. In some embodiments, the ride share passenger may carry the user device 110.

The user device 110 includes one or more of the following elements: a ride share application 198; a ride share assistant 199; a device sensor set 112; a display 114; a processor 115; and a memory 116.

In some embodiments, the ride share application 198 includes software that is operable, when executed by the processor 115, to cause the processor 115 to perform operations for providing a ride share service to a ride share passenger. For example, the ride share passenger may order a ride share service via the ride share application 198. The ride share passenger may manage (e.g., modify, cancel) the ordered ride share service via the ride share application 198. In some embodiments, the ride share assistant 199 is an element of the ride share application 198.

In some embodiments, the ride share assistant 199 includes software that is operable, when executed by the processor 125, to cause the processor 125 to execute one or more steps of methods 300 and 350 and example processes 500 and 600 described below with reference to FIGS. 3A-3B and 5A-6B. For example, the ride sharing assistant 199 receives the following inputs and outputs augmented graphical data highlighting the ride share vehicle's location on an image of the environment of the ride share vehicle 123 based on these inputs: (1) digital data describing the geographic location of the ride share vehicle 123 (i.e., the DSRC-compliant GPS data of the ride share vehicle 123); (2) digital data describing the geographic location of the user device 110 (i.e., the GPS data of the user device 110); (3) camera data describing the image of the environment of the ride share vehicle 123; and (4) sensor data describing an orientation or a change in the orientation of the user device 110.

In some embodiments, the ride share assistant 199 may be implemented using hardware including a field-programmable gate array ("FPGA") or an application-specific integrated circuit ("ASIC"). In some other embodiments, the ride share assistant 199 may be implemented using a combination of hardware and software. The ride share assistant 199 may be stored in a combination of the devices (e.g., servers or other devices), or in one of the devices.

The ride share assistant 199 is described below in more detail with reference to FIGS. 2-3B and 5A-6B.

In some embodiments, the device sensor set 112 includes one or more sensors. For example, the device sensor set 112 includes one or more camera sensors for capturing images. In another example, the device sensor set 112 includes sensors such as accelerometers and gyroscopes that detect an orientation or changes in the orientation of the user device 110. The sensors generate sensor data that describes these changes in orientation. A placement of augmented graphical data highlighting the ride share vehicle's location which is displayed on the display 114 of the user device 110 can be modified based on the changes in the orientation of the user device 110. For example, as the ride share passenger changes the orientation of the user device 110, the ride share assistant 199 uses the sensor data to detect the changes and modify the placement of the augmented graphical data.

In some embodiments, the display 114 is an electronic display of the user device 110. For example, the display 114 is a liquid crystal display (LCD) or a lighting emitting diode (LED) display. Other types of displays are possible.

In some embodiments, the processor 115 has a structure similar to that of the processor 125 and provides functionality similar to that of the processor 125. Similar description for the processor 115 is not repeated here.

In some embodiments, the memory 116 has a structure similar to that of the memory 127 and provides functionality similar to that of the memory 127. Similar description for the memory 116 is not repeated here.

In some embodiments, the memory 116 stores one or more of the following elements: the DSRC-compliant GPS data 188 of the ride share vehicle 123; GPS data 118 of the user device 110; augmented graphical data 120; sensor data 122; and camera data 124.

In some embodiments, the user device 110 receives a V2X wireless message including the DSRC-compliant GPS data 188, and the ride share assistant 199 causes the processor 115 to store the DSRC-compliant GPS data 188 on the memory 116.

The GPS data 118 is digital data that describes a geographic location of the user device 110. For example, the GPS data 118 describes a longitude and latitude of the user device 110. In some embodiments, the GPS data 118 may be retrieved by a conventional GPS unit of the user device 110. For example, a GPS unit of the user device 110 retrieves the GPS data 118 from one or more GPS satellites, and the ride share assistant 199 of the user device 110 causes the processor 115 of the user device 110 to store the GPS data 118 on the memory 116 of the user device 110.

In some embodiments, the GPS data 118 may be retrieved by a DSRC-compliant GPS unit of the user device 110 that is operable to provide GPS data describing the geographic location of the user device 110 with accuracy that is similar or identical to the lane-level accuracy.

The sensor data 122 is digital data generated by one or more sensors onboard the user device 110. For example, the one or more sensors include an accelerometer and a gyroscope, and the sensor data 122 describes an orientation or changes in the orientation of the user device 110. Other types of sensor data are possible.

The camera data 124 is digital data that describes one or more images captured by a camera sensor of the user device 110. For example, the one or more images are one or more real-life images captured by the camera sensor in real time and depict a real-life environment including the ride share vehicle 123.

The augmented graphical data 120 is digital data that describes an augmented version of an image captured by the user device 110, where the captured image depicts a real-life environment that includes the ride share vehicle. The augmented version of the image highlights a position of the ride share vehicle 123 within the real-life environment. The augmented version of the image is described below in more detail.

Figure 1B:
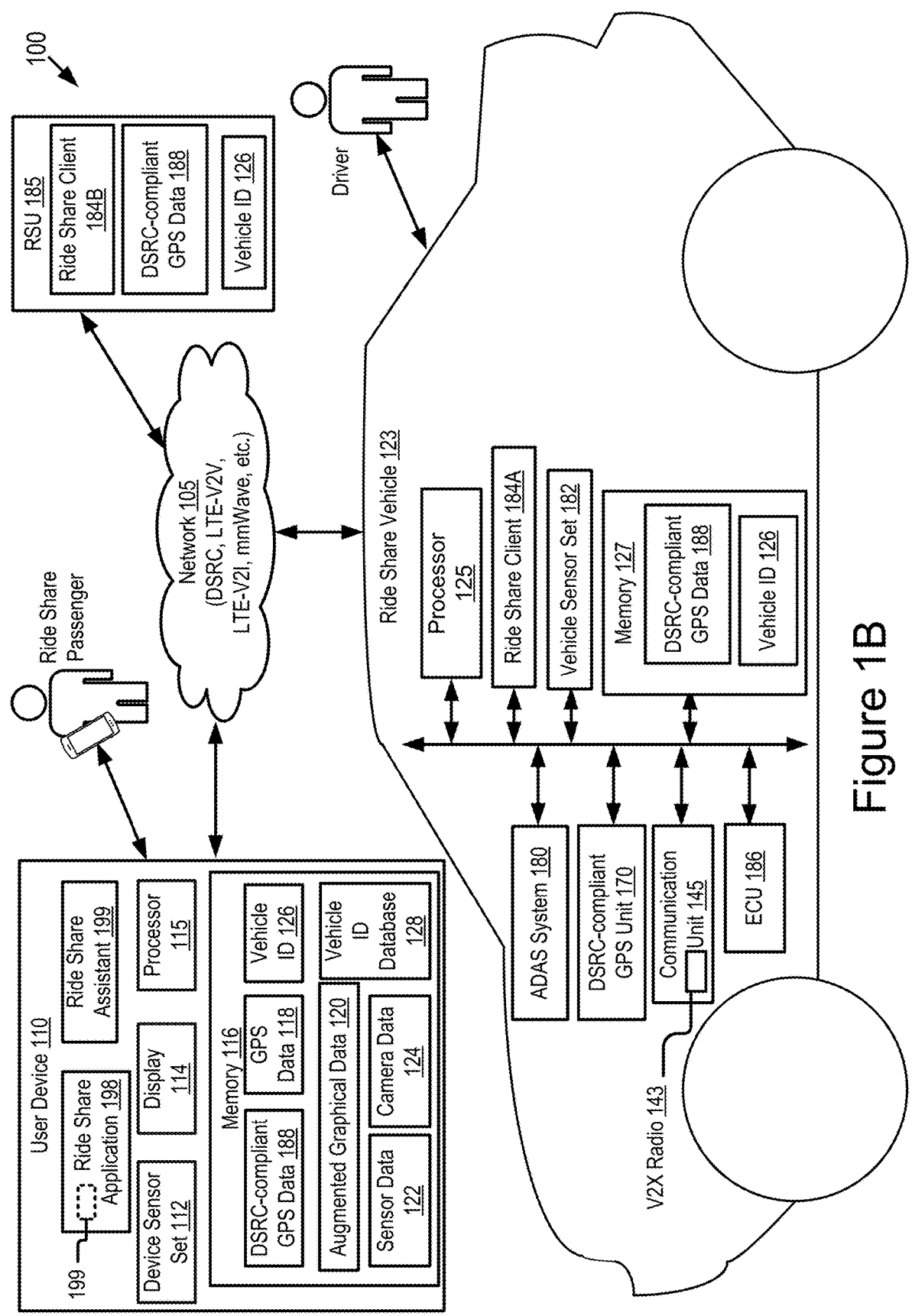
FIG. 1B is another block diagram illustrating an operating environment for a ride share client and a ride share assistant according to some embodiments.

Referring now to FIG. 1B, depicted is another block diagram illustrating the operating environment 100 according to some embodiments. In some embodiments, the driver of the ride share vehicle 123 is not required to carry a user device that includes an instance of the ride share assistant 199. The elements depicted in FIG. 1B provide similar functionality to those depicted in FIG. 1A, and so, those descriptions will not be repeated here.

As depicted in FIG. 1B, the memory 127 of the ride share vehicle 123 may further store digital data describing a vehicle ID 126 of the ride share vehicle 123. The vehicle ID 126 is used to uniquely identify the ride share vehicle 123.

In some embodiments, the ride share client 184 of the ride share vehicle 123 constructs a V2X wireless message including the DSRC-compliant GPS data 188 and the vehicle ID 126 and transmits the V2X wireless message to the network 105. The user device 110 receives the V2X wireless message via the network 105. The ride share assistant 199 causes the processor 115 to store the DSRC-compliant GPS data 188 and the vehicle ID 126 from the V2X wireless message in the memory 116 of the user device 110.

In some embodiments, the ride share client 184 of the RSU 185 may receive the V2X wireless message and store the DSRC-compliant GPS data 188 and the vehicle ID 126 from the V2X wireless message in a memory of the RSU 185. The ride share client 184 of the RSU 185 forwards the V2X wireless message to the user device 110.

The memory 116 of the user device 110 further includes a vehicle ID database 128. The vehicle ID database 128 includes digital data that identifies an identity of a ride share vehicle which is designated to execute a ride share event associated with the user device 110. For example, the vehicle ID database 128 includes a vehicle ID identifying the ride share vehicle 123 which is designated to pick up the ride share passenger.

Figure 1C:
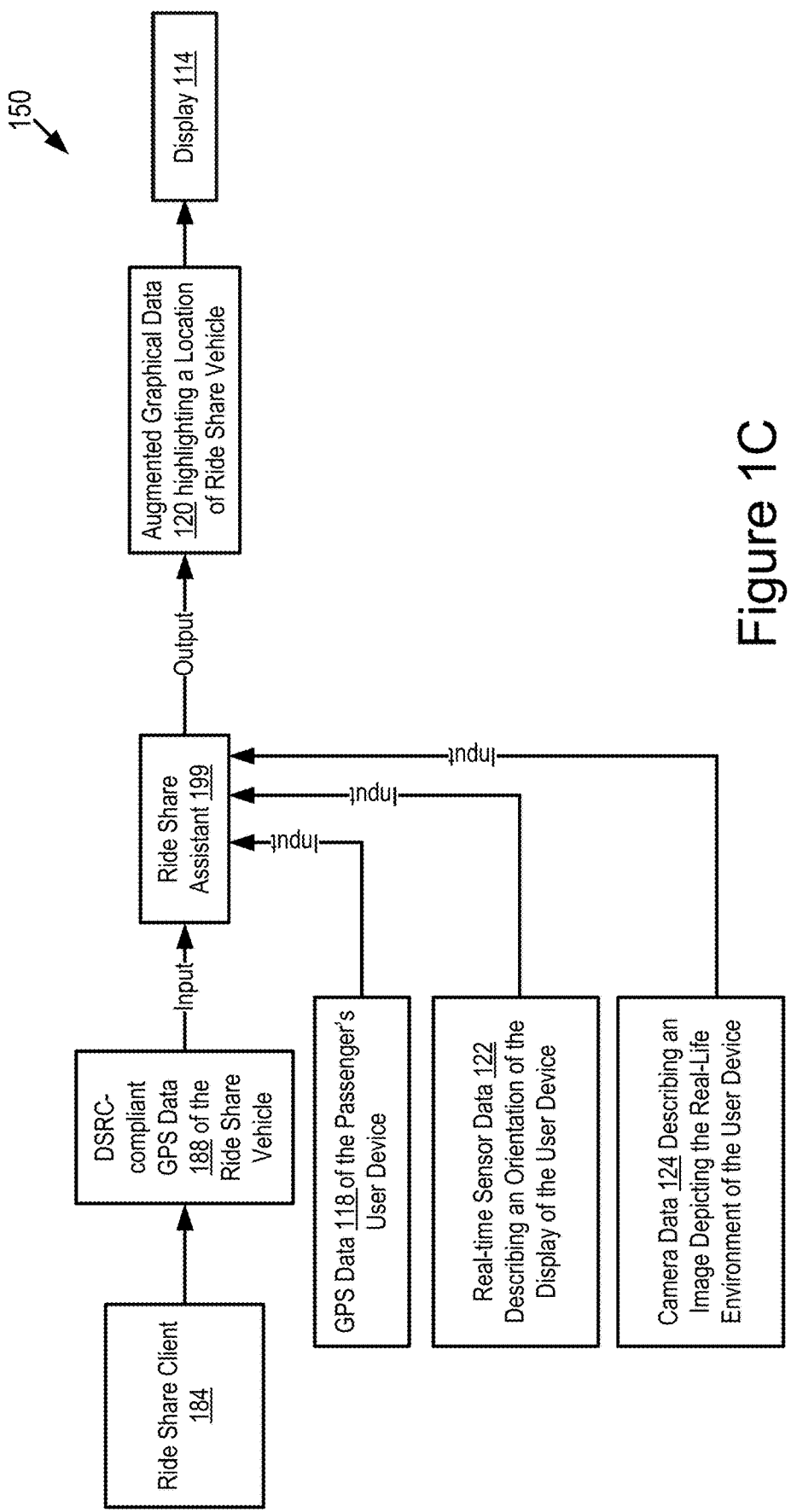
FIG. 1C is a block diagram illustrating a flow process for providing augmented graphical data on a user device according to some embodiments.

Referring now to FIG. 1C, depicted is a block diagram illustrating a flow process 150 for providing augmented graphical data on the user device 110 according to some embodiments. In some embodiments, the ride share client 184 of the ride share vehicle 123 retrieves the DSRC-compliant GPS data 188 of the ride share vehicle 123 from the DSRC-compliant GPS unit 170 and generates a V2X wireless message including the DSRC-compliant GPS data 188. The V2X wireless message is transmitted to the user device 110, so that the DSRC-compliant GPS data 188 in the V2X wireless message can be used as an input to the ride share assistant 199 of the user device 110.

The ride sharing assistant 199 outputs the augmented graphical data 120 based on the following inputs: (1) digital data describing the geographic location of the ride share vehicle 123 (i.e., the DSRC-compliant GPS data 188 of the ride share vehicle 123; (2) GPS data 118 of the user device 110 operated by the ride share passenger; (3) sensor data 122 describing an orientation of the user device 110 (e.g., real-time sensor data describing an orientation of the display 114 of the user device 110); and (4) camera data 124 describing an image that is captured by a camera sensor of the user device 110 and depicts a real-life environment of the ride share passenger. The augmented graphical data 120 describes an augmented version of the image captured by the camera sensor. The augmented version of the image is presented on the display 114 and highlights the location of the ride share vehicle 123 in the real-life environment of the ride share passenger.

Example Computer System

Figure 2:
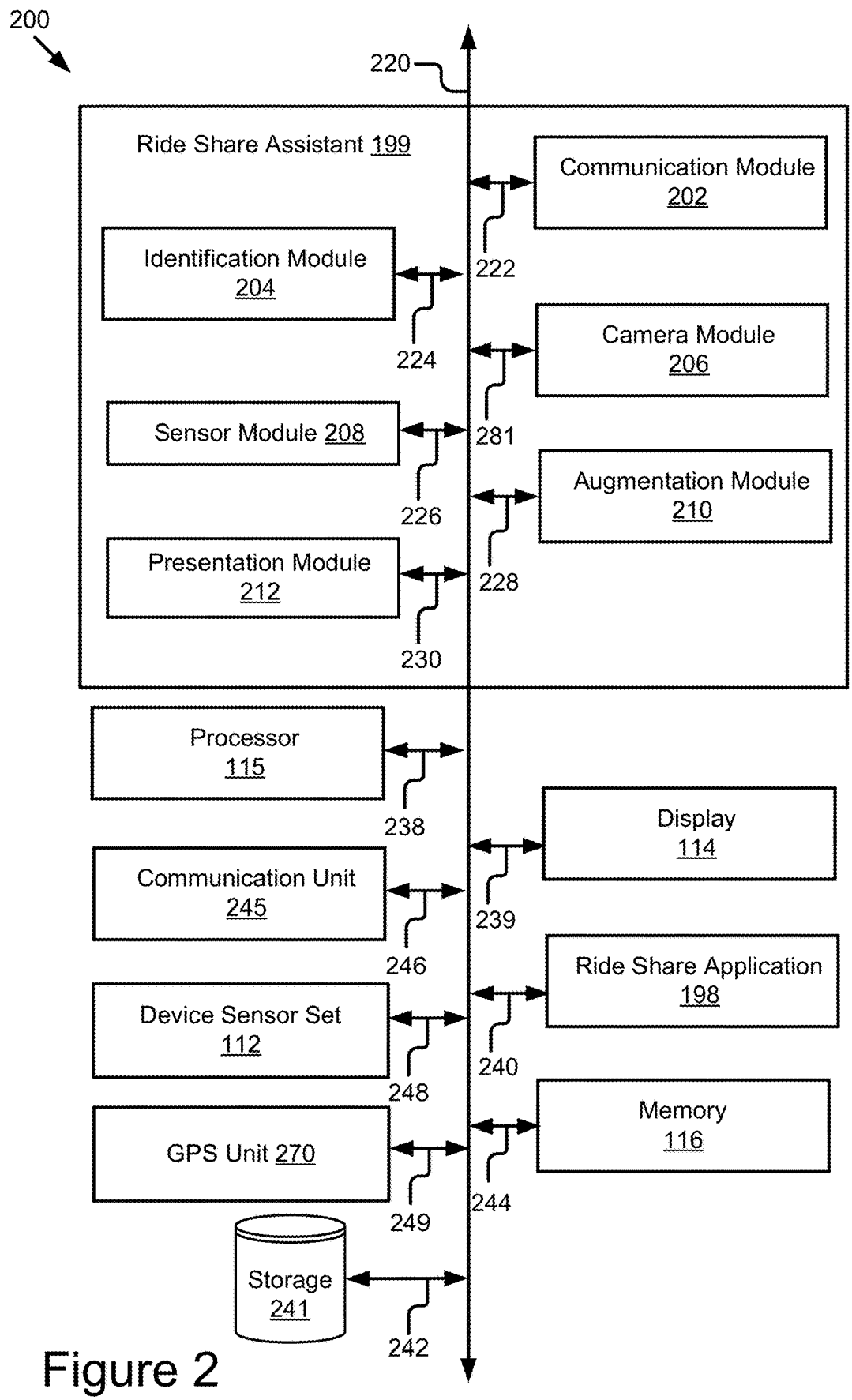
FIG. 2 is a block diagram illustrating an example computer system including a ride share assistant according to some embodiments.

Referring now to FIG. 2, depicted is a block diagram illustrating an example computer system 200 including a ride share assistant 199 according to some embodiments. In some embodiments, the computer system 200 may include a special-purpose computer system that is programmed to perform one or more steps of methods 300 and 350 described below with reference to FIGS. 3A and 3B, processes 500 and 600 described below with reference to FIGS. 5A-6B or the flow process 150 described above with reference to FIG. 1C.

In some embodiments, the computer system 200 may be an element of the user device 110.

The computer system 200 may include one or more of the following elements according to some examples: the ride share assistant 199; the processor 115; a communication unit 245; the device sensor set 112; a GPS unit 270; the display 114; the ride share application 198; the memory 116; and a storage 241. The components of the computer system 200 are communicatively coupled by a bus 220.

In the illustrated embodiment, the processor 115 is communicatively coupled to the bus 220 via a signal line 238. The communication unit 245 is communicatively coupled to the bus 220 via a signal line 246. The device sensor set 112 is communicatively coupled to the bus 220 via a signal line 248. The GPS unit 270 is communicatively coupled to the bus 220 via a signal line 249. The display 114 is communicatively coupled to the bus 220 via a signal line 239. The ride share application 198 is communicatively coupled to the bus 220 via a signal line 240. The storage 241 is communicatively coupled to the bus 220 via a signal line 242. The memory 116 is communicatively coupled to the bus 220 via a signal line 244.

The following elements of the computer system 200 are described above with reference to FIG. 1A, and so, those descriptions will not be repeated here: the processor 115; the device sensor set 112; the display 114; the ride share application 198; and the memory 116.

The memory 116 may store any of the data described above with reference to FIGS. 1A-IC. The memory 116 may store any data necessary for the computer system 200 to provide its functionality.

The communication unit 245 may have a structure similar to that of the communication unit 145 and provide functionality similar to that of the communication unit 145. Similar description will not be repeated here.

In some embodiments, the GPS unit 270 is a conventional GPS unit. For example, the GPS unit 270 may include hardware that wirelessly communicates with a GPS satellite to retrieve data that describes a geographic location of the computer system 200. For example, the GPS unit 270 retrieves the GPS data from one or more GPS satellites. In some embodiments, the GPS unit 270 is a DSRC-compliant GPS unit that is operable to provide GPS data describing the geographic location of the computer system 200 with lane-level accuracy.

The storage 241 can be a non-transitory storage medium that stores data for providing the functionality described herein. The storage 241 may be a dynamic random access memory (DRAM) device, a static random access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the ride share assistant 199 includes: a communication module 202; an identification module 204; a camera module 206; a sensor module 208; an augmentation module 210; and a presentation module 212. These components of the ride share assistant 199 are communicatively coupled to each other via the bus 220. In some embodiments, components of the ride share assistant 199 can be stored in a single server or device. In some other embodiments, components of the ride share assistant 199 can be distributed and stored across multiple servers or devices. For example, some of the components of the ride share assistant 199 may be distributed across the user device 110 and the ride share vehicle 123.

The communication module 202 can be software including routines for handling communications between the ride share assistant 199 and other components of the computer system 200. In some embodiments, the communication module 202 can be stored in the memory 116 of the computer system 200 and can be accessible and executable by the processor 115. The communication module 202 may be adapted for cooperation and communication with the processor 115 and other components of the computer system 200 via a signal line 222.

The communication module 202 sends and receives data, via the communication unit 245, to and from one or more elements of the operating environment 100 or the flow process 150. For example, the communication module 202 receives or transmits, via the communication unit 245, one or more of the following elements: the DSRC-compliant GPS data 188; and the vehicle ID 126. The communication module 202 may send or receive any of the data or messages described above with reference to FIG. 1A-IC via the communication unit 245.

In some embodiments, the communication module 202 receives data from components of the ride share assistant 199 and stores the data in one or more of the storage 241 and the memory 116. For example, the communication module 202 receives any of the data described above with reference to the memory 116 from the communication unit 245 (via the network 105, a DSRC message, a BSM, a DSRC probe, a full-duplex wireless message, etc.) and stores this data in the memory 116 (or temporarily in the storage 241 which may act as a buffer for the computer system 200).

In some embodiments, the communication module 202 may handle communications between components of the ride share assistant 199. For example, the communications module 202 may handle communications among the identification module 204, the camera module 206, the sensor module 208, the augmentation module 210 and the presentation module 212. Any of these modules may cause the communication module 202 to communicate with the other elements of the computer system 200 or the operating environment 100 (via the communication unit 245). For example, the sensor module 208 may use the communication module 202 to communicate with the device sensor set 112 and cause the device sensor set 112 to record sensor data. In a further example, the camera module 206 may use the communication module 202 to communicate with a camera sensor and cause the camera sensor to capture an image of the real-life environment in real time or near real time.

In some embodiments, the communication module 202 receives a V2X wireless message from the network 105, and the V2X wireless message includes V2X data including one or more of GPS data (such as DSRC-compliant GPS data) of the ride share vehicle 123 and a vehicle ID of the ride share vehicle 123. For example, the V2X wireless message is selected from a group that consists of: a DSRC message; a BSM; a LTE message; a LTE-V2X message; a 5G-V2X message; and a millimeter wave message, etc. The communication module 202 retrieves the GPS data (such as the DSRC-compliant GPS data) and the vehicle ID of the ride share vehicle 123 from the received V2X wireless message and sends the GPS data and the vehicle ID of the ride share vehicle 123 to the augmentation module 210 and the identification module 204 respectively.

The identification module 204 can be software including routines for identifying a ride share vehicle that is designated to execute a ride share event associated with the user device 110. In some embodiments, the identification module 204 can be stored in the memory 116 of the computer system 200 and can be accessible and executable by the processor 115. The identification module 204 may be adapted for cooperation and communication with the processor 115 and other components of the computer system 200 via a signal line 224.

In some embodiments, the identification module 204 is operable to use the digital data included in the received V2X wireless message that uniquely identifies the ride share vehicle 123 (e.g., a first vehicle ID identifying the ride share vehicle 123), in combination with the digital data that identifies the identity of a vehicle which is designated to pick up the ride share passenger (e.g., a second vehicle ID identifying the vehicle which is designated to pick up the ride share passenger), to discern that this particular V2X message is relevant to a ride share event which occurs beginning when the driver of the ride share vehicle 123 agreed to pick up the ride share passenger using the ride share vehicle 123.

Specifically, the V2X data retrieved from the received V2X wireless message includes the first vehicle ID that uniquely identifies the ride share vehicle 123 for providing a ride share service. The identification module 204 retrieves the first vehicle ID from the V2X data, and retrieves the second vehicle ID that uniquely identifies a vehicle designated to execute the ride share event associated with the user device 110 from the vehicle ID database 128. If the first vehicle ID matches the second vehicle ID (e.g., the first vehicle ID is identical to the second vehicle ID), the identification module 204 discerns that the ride share vehicle 123 is the vehicle designated to execute the ride share event associated with the user device 110, so that the DSRC-compliant GPS data of the ride share vehicle 123 included in the received V2X wireless message can be used by the augmentation module 210 to generate the augmented graphical data.

In some embodiments, the first vehicle ID and the second vehicle ID are permanent unique identifiers. In some other embodiments, the first vehicle ID and the second vehicle ID are temporary unique identifiers (TempIDs). For example, the V2X wireless message is a BSM, and the digital data included in the BSM is used as the V2X data. The digital data included in the BSM includes a TempID. The TempID is changed nominally in a particular time interval (e.g., every 5 minutes) to protect privacy by making it difficult to determine if two BSMs sent at different times were sent by the same vehicle.

In some embodiments, the TempID is conveyed to the ride share assistant 199 using a V2X wireless message. This wireless message is transmitted once or at an interval. For example, a DSRC-enabled vehicle transmits its TempID to the ride share assistant 199 of the user device 110 in each BSM (e.g., in an interval of 100 milliseconds) and the TempID can be changed every 5 minutes, or in some other interval.

In some embodiments, other information (except the TempID or other data that is already included in a BSM) can be included in a separate V2X unicast message to be transmitted from the ride share client 184 to the ride share assistant 199. This separate V2X unicast message may be encrypted for privacy. In this case, vehicle identifiers can be conveyed to the ride share assistant 199 installed on the user device of the ride share passenger via the TempID or some other forms of identifiers.

In some embodiments, a backend of the ride share client 184 (e.g., a server that is operated by the ride share service) can be configured to know what TempID its ride share vehicle is currently using, and the backend can provide digital data describing that information to the ride share assistant 199 of the user device 110 when it provides other vehicle information like a model, a license plate, a driver name, etc. If the TempID is conveyed by the backend (e.g., over a cellular connection), then the ride share assistant 199 described herein can be realized with zero changes to the V2X protocol (e.g., using a BSM).

For an opposite direction (e.g., a direction from the user device 110 to the ride share vehicle 123), the user device 110 can be configured to send a Personal Safety Message (PSM), which is a message analog to the BSM. The PSM is also standardized. The PSM also includes a TempID.

The camera module 206 can be software including routines for controlling a camera sensor of the user device 110 to capture one or more images of a real-life environment associated with the ride share passenger. In some embodiments, the camera module 206 can be stored in the memory 116 of the computer system 200 and can be accessible and executable by the processor 115. The camera module 206 may be adapted for cooperation and communication with the processor 115 and other components of the computer system 200 via a signal line 281.

In some embodiments, the camera module 206 provides an instruction to capture an image of a real-life environment associated with the ride share passenger in real time. The instruction instructs the ride share passenger to hold the user device 110 up to capture an image of the ride share passenger's environment. For example, the camera module 206 causes the display 114 to depict a graphic including this instruction.

The camera module 206 controls the camera sensor of the user device 110 to capture the image of the real-life environment in real time. For example, the camera module 206 causes the camera sensor of the user device 110 to capture one or more real-time images (or videos) of the environment of the ride share passenger. These images (or videos) are described by the camera data. The display 114 of the user device 110 does not yet display the images (or videos) captured by the camera sensor. The display 114 of the user device 110 displays an augmented version of the images (or videos) as described below. The following generation of the augmented version of the images (or videos) takes place in a matter of a fraction of a second so that the display of the augmented version of the images (or videos) appears to be in real time or near real time to the ride share passenger after the camera sensor of the user device 110 captures the images (or videos).

The sensor module 208 can be software including routines for using one or more sensors included in the device sensor set 112 to generate sensor data. In some embodiments, the sensor module 208 can be stored in the memory 116 of the computer system 200 and can be accessible and executable by the processor 115. The sensor module 208 may be adapted for cooperation and communication with the processor 115 and other components of the computer system 200 via a signal line 226.

In some embodiments, the sensor module 208 may operate one or more sensors of the device sensor set 112 to generate sensor data describing the measurements of the device sensor set 112. The sensor module 208 may cause the sensor data to be stored in the memory 116. In some embodiments, the sensor data may describe, for example, one or more of the following: GPS data related to the computer system 200; sensor data used for detecting the orientation or a change of the orientation of the display 114 of the user device 110; and any other sensor data.

In some embodiments, the sensor module 208 may cause the GPS unit 270 to retrieve positional information for the computer system 200. For example, the computer system 200 is an element of the user device 110 and the sensor module 208 may cause the GPS unit 270 to retrieve GPS data of the user device 110. The sensor module 208 may cause the communication module 202 to store the retrieved positional information in the memory 116. For example, the sensor module 208 may cause the communication module 202 to store the GPS data of the user device 110 in the memory 116.

In some embodiments, the sensor module 208 causes one or more sensors of the user device 110 (e.g., an accelerometer, a gyroscope) to capture sensor data that describes the orientation or a change in the orientation of the display 114 of the user device 110. In some embodiments, this sensor data may assist in the placement of the augmented graphical data depicted by the display 114 (see, e.g., FIGS. 7A-7B).

The augmentation module 210 can be software including routines that, when executed by the processor 115, cause the processor 115 to generate augmented graphical data. In some embodiments, the augmentation module 210 can be stored in the memory 116 of the computer system 200 and can be accessible and executable by the processor 115. The augmentation module 210 may be adapted for cooperation and communication with the processor 115 and other components of the computer system 200 via a signal line 228.

In some embodiments, the communication module 202 receives a V2X wireless message that is transmitted by the ride share vehicle 123 and includes V2X data describing the ride share vehicle 123. The augmentation module 210 generates augmented graphical data based on the V2X data, where the augmented graphical data describes an augmented version of the image captured by the user device 110 and depicting a real-life environment that includes the ride share vehicle 123. The augmented version of the image highlights a position of the ride share vehicle 123 within the real-life environment. For example, the ride share vehicle 123 provides a ride share service to a user of the user device 110 who is a ride share passenger, and the augmented graphical data assists the user to locate the ride share vehicle 123 and receive the ride share service.

Specifically, the V2X data includes GPS data of the ride share vehicle 123 (e.g., DSRC-compliant GPS data of the ride share vehicle 123). The augmentation module 210 retrieves GPS data of the user device 110 and camera data describing the image that depicts the real-life environment. In some embodiments, the augmentation module 210 generates the augmented graphical data based on one or more of the following: the GPS data of the ride share vehicle 123 (e.g., the DSRC-compliant GPS data of the ride share vehicle 123); the GPS data of the user device 110; and the camera data. In some embodiments, the augmentation module 210 retrieves sensor data describing an orientation of the display 114 of the user device 110, and generates the augmented graphical data further based on the sensor data.

For example, the DSRC-compliant GPS data of the ride share vehicle 123 describes the geographic location of the ride share vehicle 123 with lane-level accuracy. Lane-level accuracy means that the DSRC-compliant GPS data of the ride share vehicle 123 describes the geographic position of the ride share vehicle 123 with an accuracy of plus or minus half a width of a lane of a roadway in all directions (North, South, East, West). In some embodiments, the augmentation module has access to GPS data of the user device 110 (which may itself be DSRC-compliant GPS data having lane-level accuracy). Accordingly, in some embodiments the augmentation module 210 is able to identify a location of the ride share vehicle 123 in the sensor data recorded by the user device 110 (e.g., within an image recorded by a camera sensor of the user device 110) based on a relative position of the ride share vehicle 123 and the user device 110 as indicated by an analysis of the DRSC-compliant GPS data of the ride share vehicle 123 and the DSRC-compliant GPS data of the user device 110. This analysis may include other factors such as an orientation of the user device 110, which may be indicated by an accelerometer or some other sensor included in the user device 110. If the ride share vehicle 123 is within the field of view of the camera sensor of the user device 110, which means that the ride share vehicle 123 is captured in the image taken by the camera sensor (e.g., assume that there is a line of sight between the ride share vehicle 123 and the user device 110), the augmentation module 210 may perform object identification and recognition from the image using one or more image processing techniques (e.g., an image processing technique using a convolutional neural network) to identify the ride share vehicle 123 in the image. In some embodiments, the augmentation module 210 may utilize vehicle information of the ride share vehicle 123 (e.g., a make, a model, color of the ride share vehicle 123, etc.) to identify the ride share vehicle 123 in the image.

In another example, based on the geographic location of the ride share vehicle 123 (described by the DSRC-compliant GPS data of the ride share vehicle 123) and the geographic location of the user device 110 (described by the GPS data of the user device 110), the augmentation module 210 determines a relative position of the ride share vehicle 123 to the user device 110. The relative position includes a distance between the ride share vehicle 123 and the user device 110 and an orientation (e.g., an angle) of the ride share vehicle 123 relative to the user device 110. Based on the relative position of the ride share vehicle 123 to the user device 110, the augmentation module 210 determines whether the ride share vehicle 123 is within a field of view of the camera sensor of the user device 110. If the ride share vehicle 123 is within the field of view of the camera sensor of the user device 110, which means that the ride share vehicle 123 is captured in the image taken by the camera sensor (e.g., assume that there is a line of sight between the ride share vehicle 123 and the user device 110), the augmentation module 210 may perform object identification and recognition from the image using one or more image processing techniques (e.g., an image processing technique using a convolutional neural network) to identify the ride share vehicle 123 in the image. In some embodiments, the augmentation module 210 may utilize vehicle information of the ride share vehicle 123 (e.g., a make, a model, color of the ride share vehicle 123, etc.) to identify the ride share vehicle 123 in the image. The augmentation module 210 may also use other ways to identify the ride share vehicle 123 in the image.

After identifying the ride share vehicle 123 in the image captured by the camera sensor of the user device 110, the augmentation module 210 modifies the image to form an augmented version of the image, so that the location of the ride share vehicle 123 is highlighted within the real-life environment. For example, the image is modified to be black and white, but the ride share vehicle 123 is in color. Many other variations for highlighting the location of the ride share vehicle 123 are possible, including for example, placing a graphical overlay that highlights the location of the ride share vehicle 123. An example of the augmented version of the image is provided in FIG. 7A, which is described below in more detail.

The image as well as the augmented version of the image is updated in real time as the objects in the real-life environment move or the orientation of the user device 110 changes (e.g., the ride share passenger's hand moves). For example, assume that the sensor data describes that an orientation of the display 114 of the user device 110 rotates clockwise by 90 degrees. Then, a placement of the augmented version of the image on the display 114 is changed accordingly.

In some embodiments, the augmented graphical data describing the augmented version of the image includes one of augmented-reality (AR) content, virtual-reality (VR) content and mixed-reality (MR) content, and the ride share vehicle 123 on the augmented version of the image is augmented by computer-generated perceptual information. For example, the computer-generated perceptual information includes visual information such as color changes in the image (e.g., the image being black and white while the ride share vehicle 123 being in color), a graphical overlay on the ride share vehicle 123, a blinking of the ride share vehicle 123, etc. Alternatively or additionally, the computer-generated perceptual information includes audio information such as audio instructions that help the ride share passenger navigate to the ride share vehicle 123. For example, a speaker symbol can be depicted. If the ride share passenger touches on the speaker symbol, the audio instructions can be played to help the ride share passenger navigate to the ride share vehicle 123.

In some embodiments, the ride share vehicle 123 is not yet in line of sight but is within a V2X communication range of the user device 110 or a V2X communication range of the RSU 185 that relays wireless messages to the user device 110. The augmentation module 210 generates the augmented graphical data at least by: superimposing a representation of the ride share vehicle 123 (e.g., an image of the ride share vehicle 123) on the real-life environment based on a geographic location of the ride share vehicle 123 to form the augmented version of the image, so that the representation of the ride share vehicle 123 is presented together with the real-life environment on the display 114 of the user device 110. An example of the augmented version of the image is provided in FIG. 7B, which is described below in more detail.

In this non-line-of-sight (NLOS) case, the ride share assistant 199 is able to virtually locate the ride share vehicle 123 when the vehicle is not yet in sight by the ride share passenger but is within a communication range of the user device 110. The approaching NLOS ride share vehicle 123, which is blocked by an obstacle such as a wall, a building, a tree, a hill, etc., can be virtually displayed at its true location on the other side of the wall, the building, the tree, the hill, etc. For example, the augmentation module 210 can superimpose a snapshot of the ride share vehicle 123 on the image seen by the ride share passenger. Optionally, the augmentation module 210 can retrieve sensor data describing a roadway environment of the ride share vehicle 123 from a V2X wireless message transmitted by the ride share vehicle 123, and superimpose a snapshot of the ride share vehicle 123 within the roadway environment on the image seen by the ride share passenger.

Examples of this NLOS use case are now described. In a first example, a ride share passenger is waiting at a terminal of an airport and a road approaching the terminal is curved so that approaching cars cannot be seen until rounding the curve about 50 meters away. However, by performing operations similar to those described above via V2X communication with an approaching car, the approaching car's location can be virtually identified even before it rounds the curve, maybe as much as 300 meters away. In a second example that is similar to the first example above but in an urban setting, when the approaching car is on a side street as it approaches, the ride share passenger may be on a sidewalk or inside an adjacent building. The approaching car's location can be virtually identified even before the approaching car is within the line of sight of the ride share passenger. In a third example that is similar to the first example above but the ride share passenger is waiting inside his/her home for pickup, the approaching car can be virtually located as it comes through the neighborhood.

In all of these NLOS cases, the depiction of the vehicle location despite NLOS conditions improves efficiency of engaging the ride for the passenger and adds early peace of mind that the ride is approaching. A communication range is typically 300-500 meters in straight line conditions, and 100-150 meters when communicating around a blocked corner. In all of these NLOS cases, the vehicle location can be determined more accurately than from a map provided by an existing ride share application. This can be especially useful if, for example, it's raining, or the passenger is spending time with family members prior to leaving and wants to wait to exit the building until the vehicle is actually arriving.

The presentation module 212 can be software including routines that, when executed by the processor 115, cause the processor 115 to present the augmented graphical data on the user device 110. In some embodiments, the presentation module 212 can be stored in the memory 116 of the computer system 200 and can be accessible and executable by the processor 115. The presentation module 212 may be adapted for cooperation and communication with the processor 115 and other components of the computer system 200 via a signal line 230.

In some embodiments, the presentation module 212 presents the augmented graphical data on the display 114 of the user device 110 so that the ride share vehicle 123 is more easily located in the real-life environment. For example, the presentation module 212 presents the augmented version of the image on the display 114 by highlighting the ride share vehicle 123 within the real-life environment depicted by the image.

Example Processes

Figure 3A:
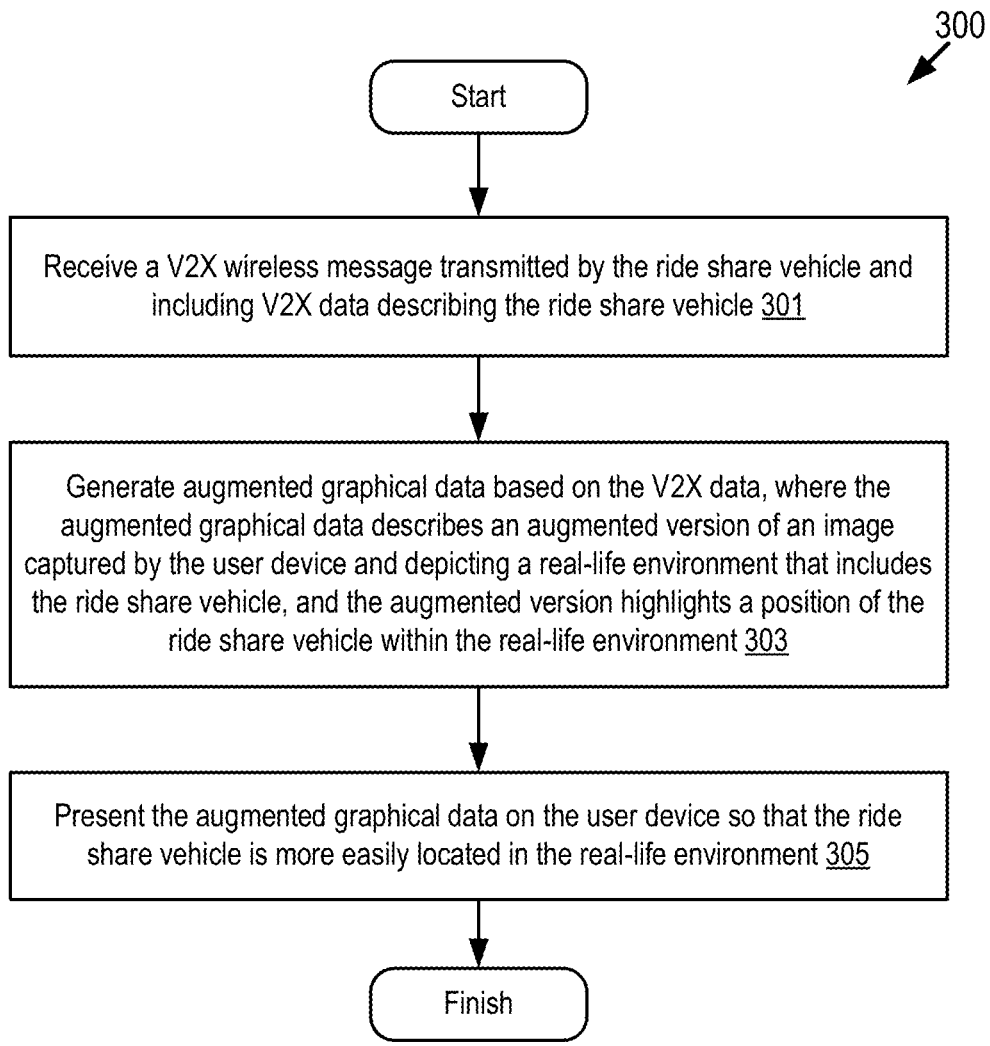
FIG. 3A depicts a method for providing augmented graphical data on a user device according to some embodiments.

Referring now to FIG. 3A, depicted is a flowchart of an example method 300 for providing augmented graphical data on the user device 110 according to some embodiments. The steps of the method 300 are executable in any order, and not necessarily the order depicted in FIG. 3A.

At step 301, the communication module 202 receives a V2X wireless message transmitted by the ride share vehicle 123 and including V2X data describing the ride share vehicle 123.

At step 303, the augmentation module 210 generates augmented graphical data based on the V2X data. The augmented graphical data describes an augmented version of an image captured by the user device 110, where the image depicts a real-life environment that includes the ride share vehicle 123. The augmented version of the image highlights a position of the ride share vehicle 123 within the real-life environment.

At step 305, the presentation module 212 presents the augmented graphical data on the user device 110 so that the ride share vehicle 123 is more easily located in the real-life environment. For example, the ride share vehicle 123 provides a ride share service to a user of the user device 110 and the augmented graphical data assists the user to locate the ride share vehicle 123 and receive the ride share service.

Figure 3B:
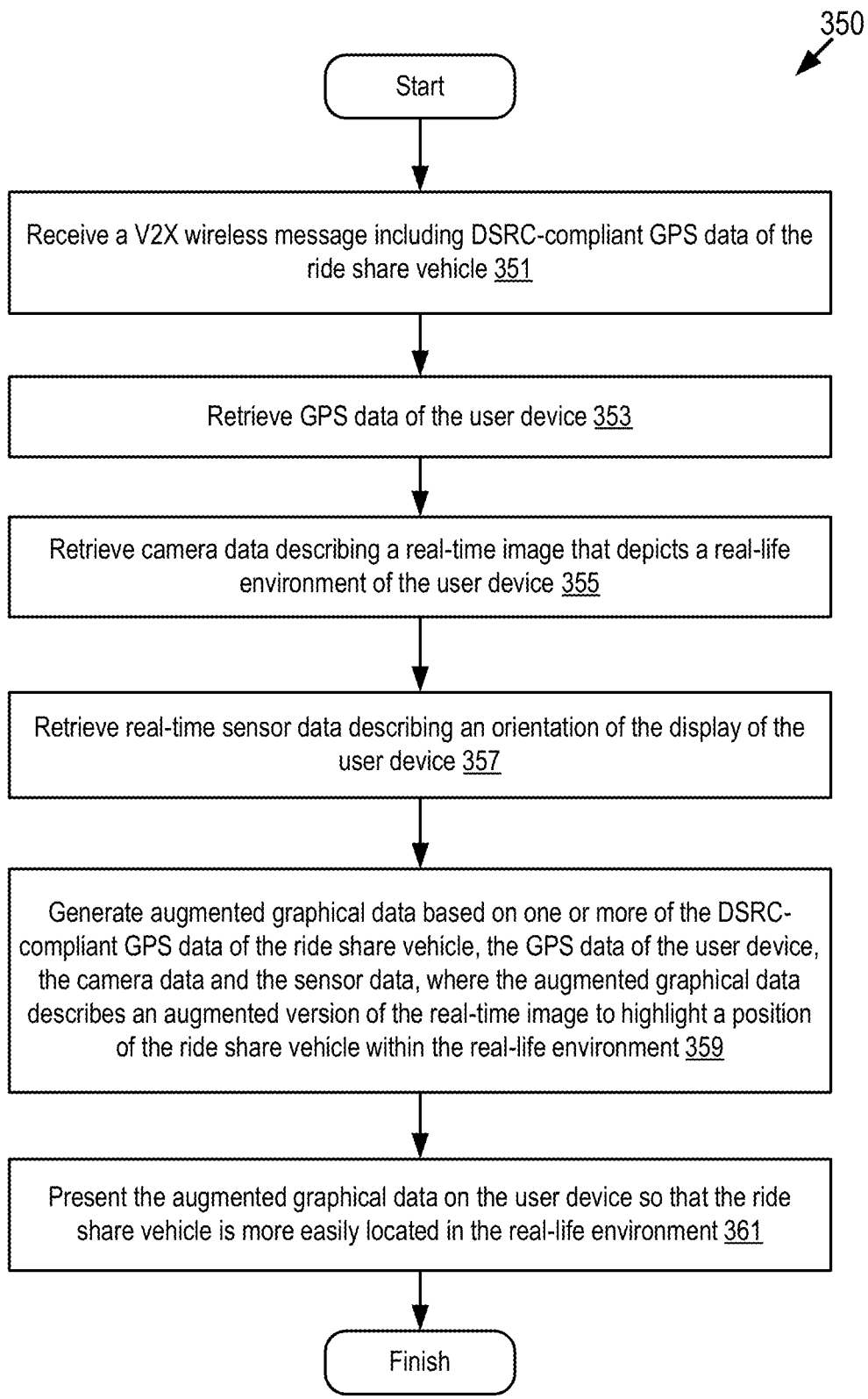
FIG. 3B depicts another method for providing augmented graphical data on a user device according to some embodiments

Referring now to FIG. 3B, depicted is a flowchart of another example method 350 for providing augmented graphical data on the user device 110 according to some embodiments. The steps of the method 350 are executable in any order, and not necessarily the order depicted in FIG. 3B.

At step 351, the communication module 202 receives a V2X wireless message transmitted by the ride share vehicle 123 and including DSRC-compliant GPS data of the ride share vehicle 123.

At step 353, the communication module 202 retrieves GPS data of the user device.

At step 355, the communication module 202 retrieves camera data describing a real-time image that depicts a real-life environment of the user device 110 (e.g., a real-life environment where the ride share passenger locates).

At step 357, the communication module 202 retrieves real-time sensor data describing an orientation of the display 114 of the user device 110.

At step 359, the augmentation module 210 generates the augmented graphical data based on one or more of the DSRC-compliant GPS data of the ride share vehicle 123, the GPS data of the user device 110, the camera data and the sensor data. The augmented graphical data describes an augmented version of the real-time image to highlight a position of the ride share vehicle 123 within the real-life environment.

At step 361, the presentation module 212 presents the augmented graphical data on the user device 110 so that the ride share vehicle 123 is more easily located in the real-life environment.

Figure 4:
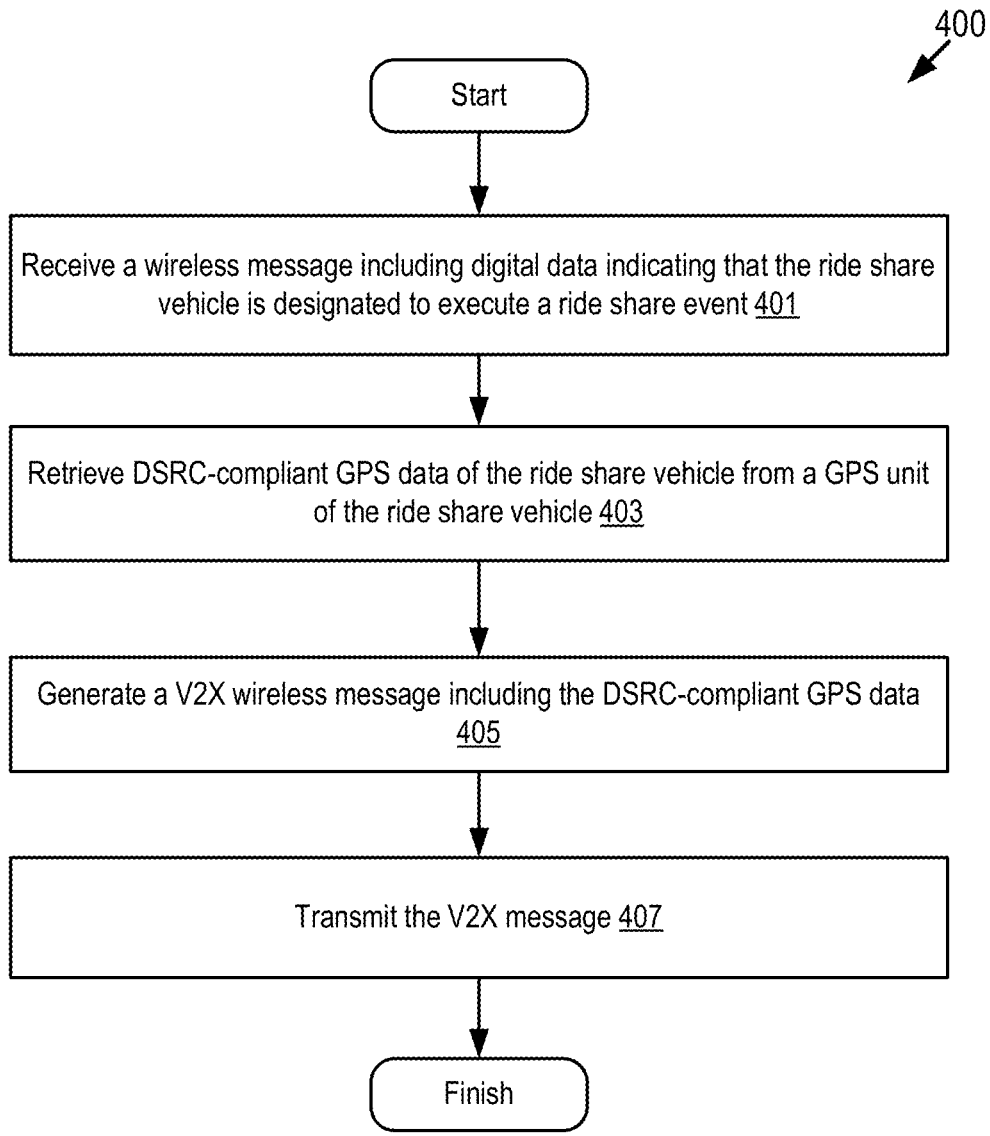
FIG. 4 depicts a method for providing GPS data of a ride share vehicle according to some embodiments

FIG. 4 depicts a method for providing GPS data of the ride share vehicle 123 according to some embodiments. The steps of the method 400 are executable in any order, and not necessarily the order depicted in FIG. 4.

At step 401, the ride share client 184 receives a wireless message including digital data indicating that the ride share vehicle 123 is designated to execute a ride share event.

For example, a ride share service can be initiated with communications between a ride share passenger and a cloud server. The ride share client 184 receives the wireless message indicating that the ride share vehicle 123 is designated to execute the ride share event from the cloud server (e.g., similar to that a ride share application on a user device currently receives initial vehicle information over a cellular link from the cloud server). The wireless message can be received at any time. In some examples, the wireless message can include a vehicle identifier that may be used later in a V2X message at steps 405 and 407.

In some embodiments, the wireless message is a V2X wireless message. In some other embodiments, the wireless message can by any other type of wireless messages (e.g., a cellular message, a WiFi message, etc.).

In some embodiments, the ride share client 184 installed in the ride share vehicle 123 determines that the ride share vehicle 123 is being used to pick up a ride share passenger. For example, the driver who carries a smartphone accepts a request to pick up a ride share passenger using a ride share application 198 which is installed on his/her smartphone. The smartphone also includes an instance of the ride share assistant 199 which may be a module of the ride share application 198. The ride share assistant 199 installed in the smartphone of the driver sends a first V2X wireless message to the ride share client 184 installed in the ECU 186 of the ride share vehicle 123. The first V2X wireless message includes digital data indicating that the ride share vehicle 123 has an appointment to pick up the ride share passenger. The digital data may also include identification information of the ride share passenger (e.g., a telephone number, an email address, a media access control (MAC) address) which is usable to unicast a second V2X wireless message to the user device 110 of the ride share passenger.

At step 403, the ride share client 184 retrieves GPS data (e.g., DSRC-compliant GPS data) of the ride share vehicle 123 from a GPS unit (e.g., the DSRC-compliant GPS unit 170) of the ride share vehicle 123.

At step 405, the ride share client 184 generates a V2X wireless message including the GPS data (e.g., the DSRC-compliant GPS data) of the ride share vehicle 123.

At step 407, the ride share client 184 transmits the V2X message to the user device 110 of the ride share passenger. For example, the ride share client 184 causes the V2X radio 143 of the communication unit 145 installed in the ride share vehicle 123 to begin transmitting (via broadcast or unicast) the V2X wireless message that includes the DSRC-compliant GPS data of the ride share vehicle 123.

In some embodiments, the V2X wireless message is a unicast message further including an identifier of the user device 110 operated by the ride share passenger as a destination. The unicast message also includes the GPS data (e.g., the DSRC-compliant GPS data) of the ride share vehicle 123.

In some other embodiments, the V2X message is a broadcast message further including digital data that uniquely identifies the ride share vehicle 123 (e.g., a vehicle ID). For example, the ride share client 184 installed in the ride share vehicle 123 constructs a BSM. The BSM includes, among other things: (1) the DSRC-compliant GPS data; and (2) the digital data that uniquely identifies the ride share vehicle 123. The ride share client 184 causes the V2X radio 143 of the communication unit 145 installed in the ride share vehicle 123 to begin transmitting (via broadcast) the BSM via any form of V2X communications.

Figure 5A:
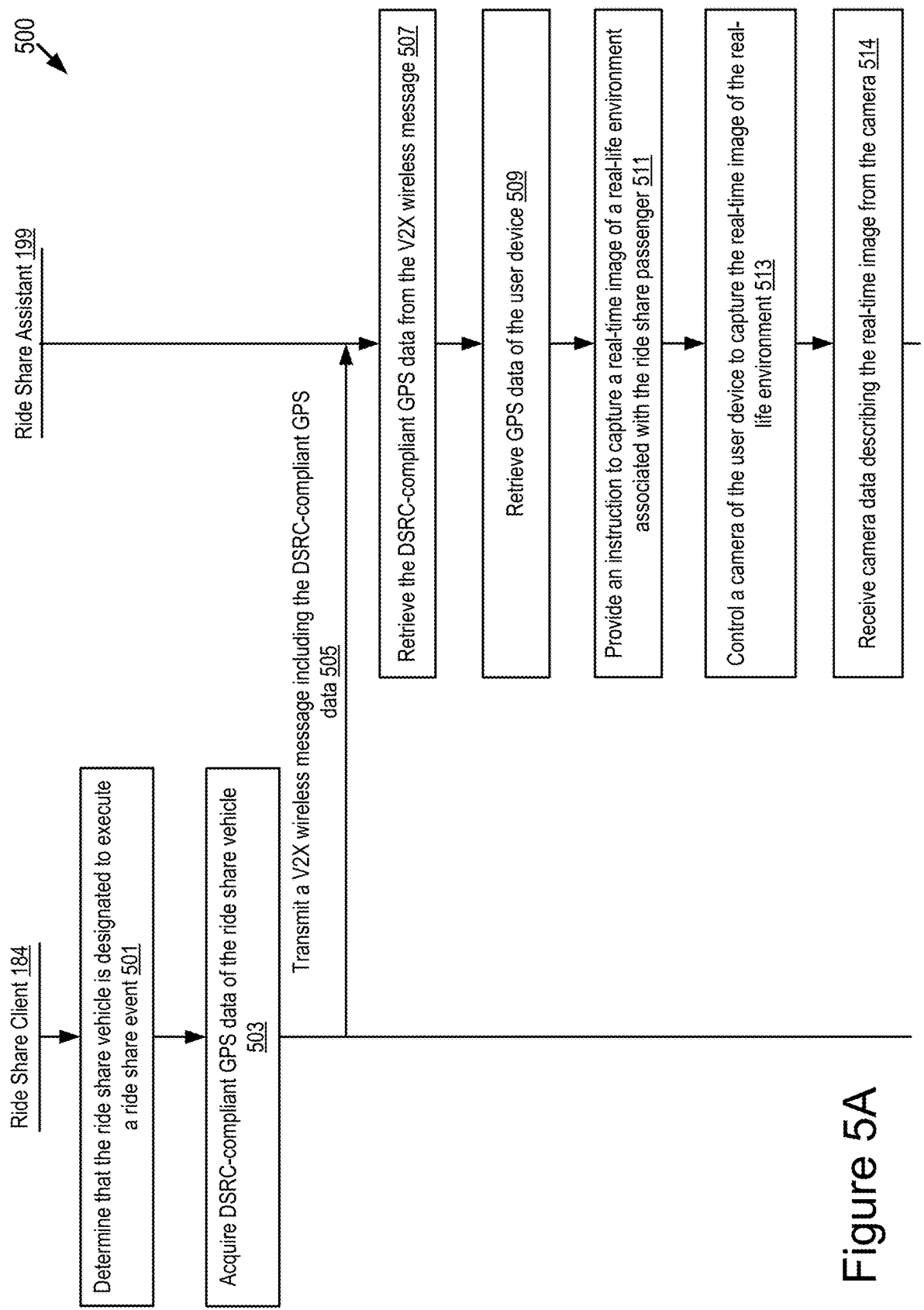
FIGS. 5A-5B depicts an example process for providing augmented graphical data on a user device according to some embodiments.
Figure 5B:
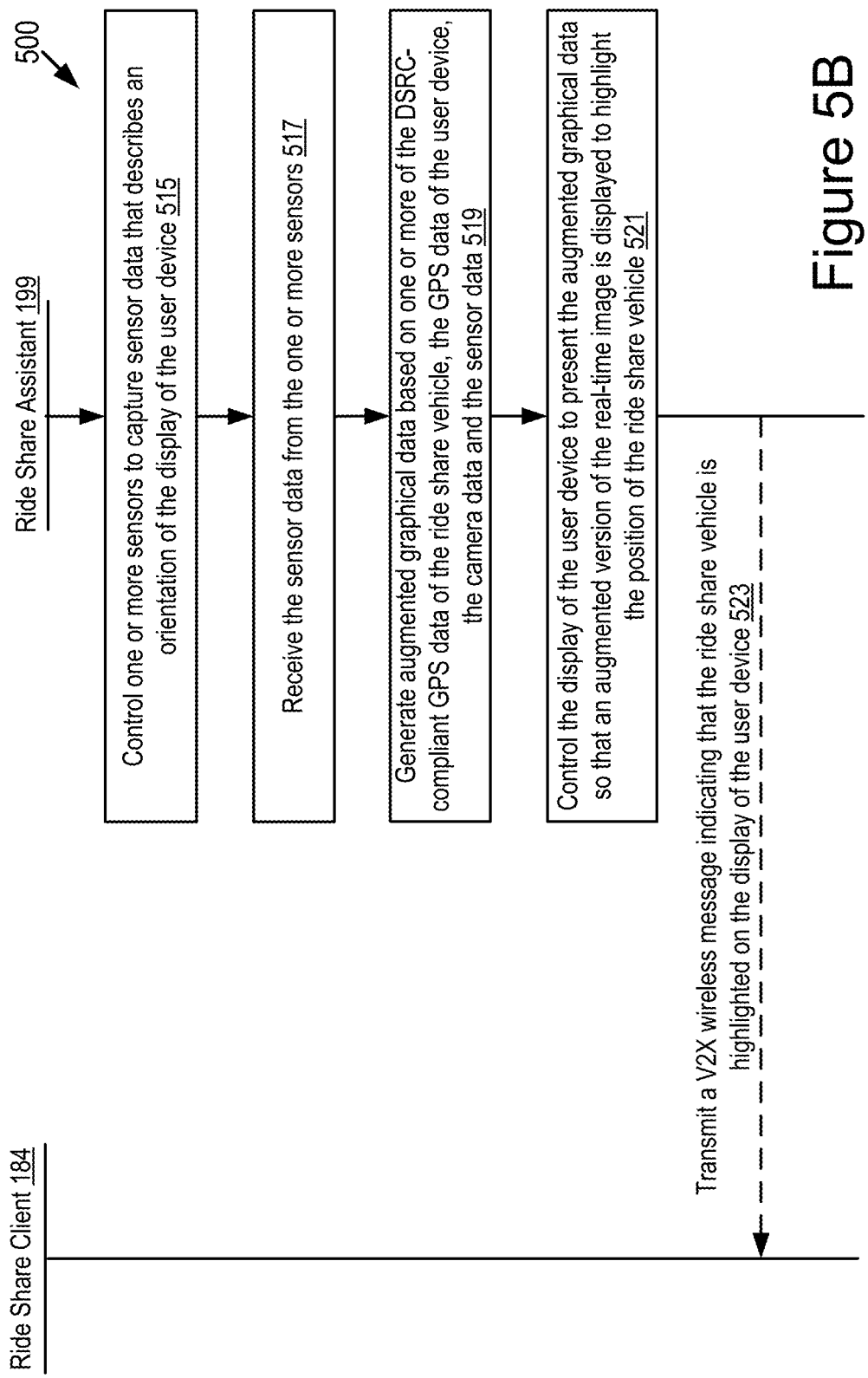

FIGS. 5A-5B depicts an example process 500 for providing augmented graphical data on the user device 110 according to some embodiments. The steps of the process 500 are executable in any order, and not necessarily the order depicted in FIGS. 5A-5B.

In the example process 500, the driver of the ride share vehicle 123 carries a user device (e.g., a smartphone) that includes an instance of the ride share assistant 199, which is common since ride share applications require their drivers to carry a smartphone that includes their smartphone application. An operating environment of the example process 500 can be referred to in FIG. 1A. The ride share client 184 and the ride share assistant 199 are operable to execute one or more of the following steps.

Referring to FIG. 5A, at step 501, the ride share client 184 of the ride share vehicle 123 determines that the ride share vehicle 123 that provides a ride share service is designated to execute a ride share event for the ride share passenger.

In some embodiments, the ride share client 184 installed in the ride share vehicle 123 determines that the ride share vehicle 123 is being used to pick up a ride share passenger. For example, the driver accepts a request to pick up a ride share passenger using a ride share application 198 which is installed on his/her smartphone. The smartphone also includes an instance of the ride share assistant 199 which may be a module of the ride share application 198. The ride share assistant 199 installed in the smartphone of the driver sends a wireless message to the ride share client 184 installed in the ECU 186 of the ride share vehicle 123. The wireless message includes digital data indicating that the ride share vehicle 123 has an appointment to pick up the ride share passenger. The digital data may also include identification information of the ride share passenger (e.g., a telephone number, an email address, a MAC address) which is usable to unicast a V2X message to the user device 110 of the ride share passenger.

At step 503, the ride share client 184 installed in the ride share vehicle 123 acquires GPS data (e.g., DSRC-compliant GPS data) of the ride share vehicle 123 from a GPS unit (e.g., the DSRC-compliant GPS unit 170) of the ride share vehicle 123.

At step 505, the ride share client 184 of the ride share vehicle 123 transmits a V2X wireless message including the GPS data (e.g., the DSRC-compliant GPS data) of the ride share vehicle 123. For example, the ride share client 184 installed in the ride share vehicle 123 causes the V2X radio 143 of the communication unit 145 installed in the ride share vehicle 123 to begin transmitting (via broadcast or unicast) a V2X wireless messages that includes the GPS data (e.g., the DSRC-compliant GPS data) of the ride share vehicle 123.

At step 507, the user device 110 of the ride share passenger receives the V2X wireless message, and then the ride share assistant 199 of the user device 110 retrieves the GPS data (e.g., the DSRC-compliant GPS data) of the ride share vehicle 123 from the V2X wireless message.

At step 509, the ride share assistant 199 of the user device 110 retrieves GPS data of the user device 110 associated with the ride share passenger from the GPS unit 270.

At step 511, the ride share assistant 199 of the user device 110 provides an instruction to capture a real-time image of a real-life environment associated with the ride share passenger. For example, the ride share assistant 199 instructs the ride share passenger to hold the user device 110 up to capture an image of the ride share passenger's environment. For example, the ride share assistant 199 causes the display 114 to depict a graphic including this instruction.

At step 513, the ride share assistant 199 of the user device 110 controls a camera of the user device 110 to capture the real-time image of the real-life environment. For example, the ride share assistant 199 causes the camera of the user device 110 operated by the ride share passenger to capture one or more real-time images (or videos) of the environment of the ride share passenger. The one or more images (or videos) are described by the camera data. The display 114 of the user device 110 does not yet display the one or more images (or videos) captured by the camera. The following steps 514-519 take place in a matter of a fraction of a second so that the image display process (or the video display process) seems correct to the ride share passenger when he/she views the display 114 of the user device 110.

At step 514, the ride share assistant 199 of the user device 110 receives the camera data describing the real-time image from the camera of the user device 110.

Referring to FIG. 5B, at step 515, the ride share assistant 199 of the user device 110 controls one or more sensors to capture sensor data that describes an orientation of the display 114 of the user device 110. For example, the ride share assistant 199 causes onboard sensors of the user device 110 to capture sensor data that describes the orientation of the display 114 of the user device 110.

At step 517, the ride share assistant 199 of the user device 110 receives the sensor data from the one or more sensors.

At step 519, the ride share assistant 199 of the user device 110 generates augmented graphical data based on one or more of the GPS data (e.g., the DSRC-compliant GPS data) of the ride share vehicle 123, the GPS data of the user device 110, the camera data and the sensor data.

For example, the ride share assistant 199 receives the following inputs: the digital data describing the geographic location of the ride share vehicle (i.e., the DSRC-compliant GPS data of the ride share vehicle 123); digital data describing the geographic location of the user device 110 (i.e., the GPS data of the user device 110); camera data describing the image of the environment of the ride share vehicle 123; and sensor data describing an orientation or a change in the orientation of the user device 110. Based on these inputs, the ride share assistant 199 outputs the augmented graphical data highlighting the ride share vehicle's location in the environment which is depicted by the camera data.

At step 521, the ride share assistant 199 of the user device 110 controls the display 114 of the user device 110 to present the augmented graphical data so that an augmented version of the real-time image is displayed to highlight the position of the ride share vehicle 123. For example, the ride share assistant 199 causes the display 114 of the user device 110 to depict the real-time real-life image described by the camera data, where the image is modified to include one of augmented-reality content, virtual-reality content and mixed-reality content, and the ride share vehicle in the image is augmented by computer-generated perceptual information.

Optionally, at step 523, the ride share assistant 199 of the user device 110 transmits a V2X wireless message indicating that the ride share vehicle 123 is highlighted on the display 114 of the user device 110 to the ride share client 184.

Figure 6A:
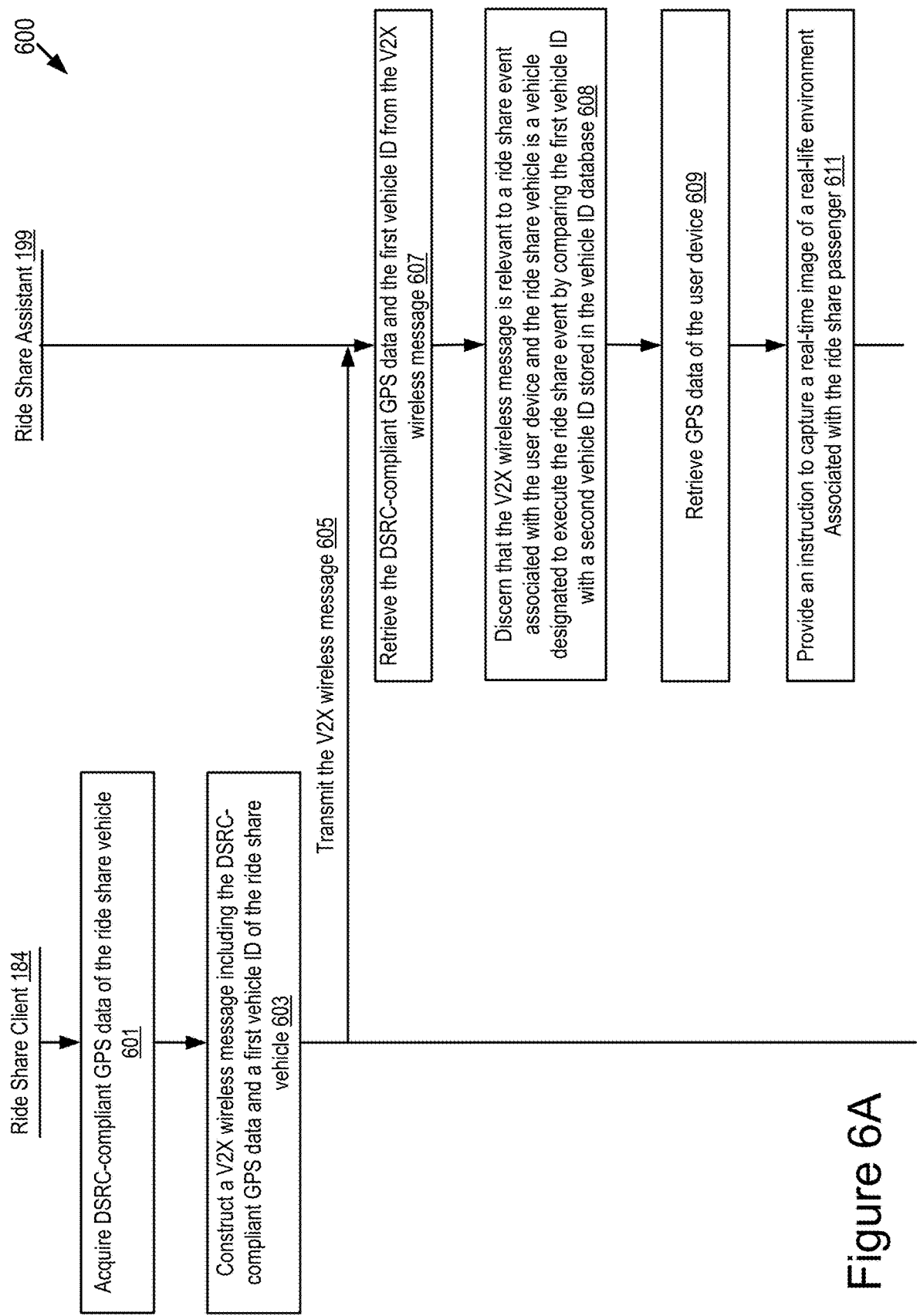
FIGS. 6A-6B depicts another example process for providing augmented graphical data on a user device according to some embodiments.
Figure 6B:
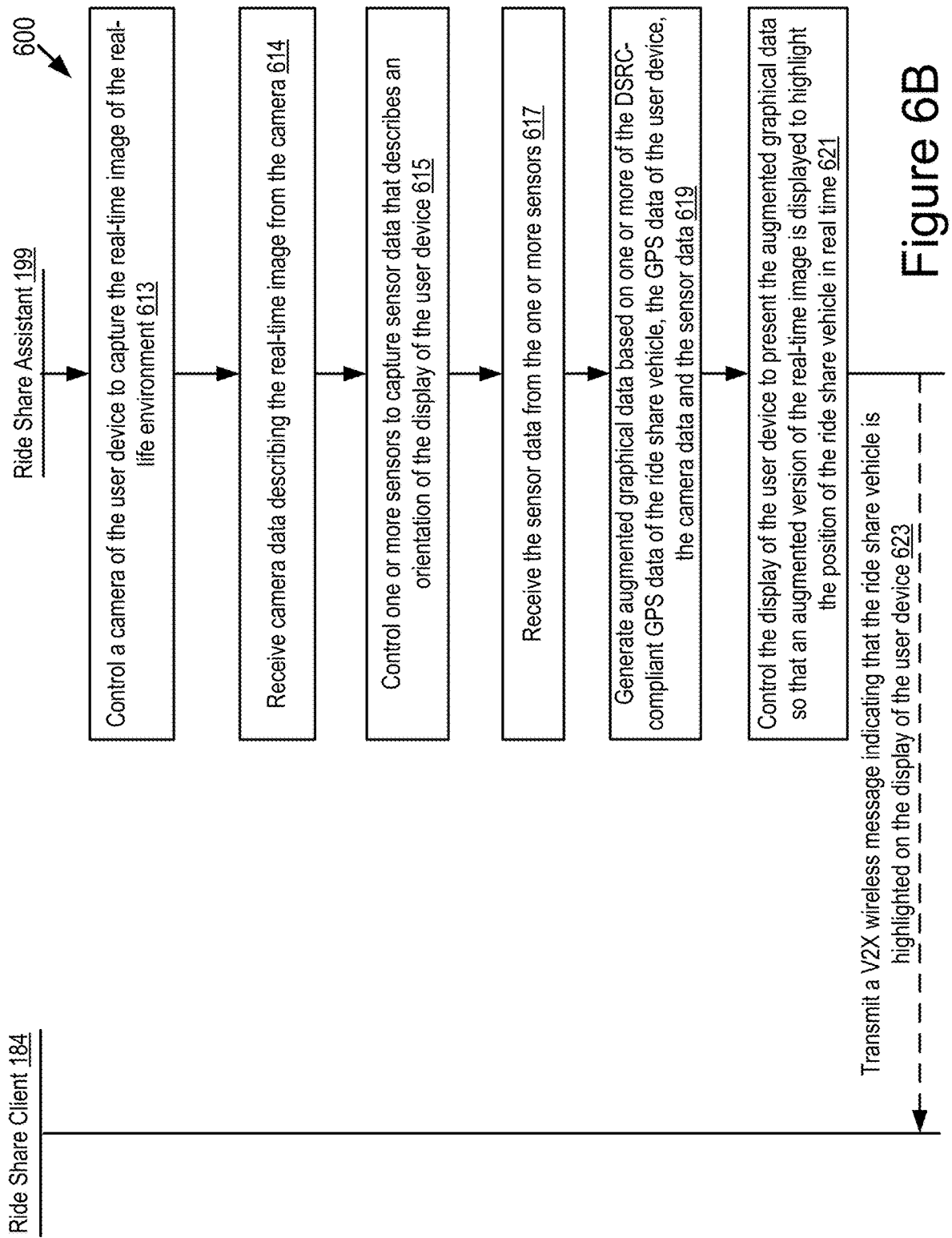

FIGS. 6A-6B depicts another example process 600 for providing augmented graphical data on the user device 110 according to some embodiments. The steps of the process 600 are executable in any order, and not necessarily the order depicted in FIGS. 6A-6B.

In the example process 600, the driver of the ride share vehicle 123 is not required to carry a user device (e.g., a smartphone) that includes an instance of the ride share assistant 199. An operating environment of the example process 600 can be referred to in FIG. 1B. The ride share client 184 and the ride share assistant 199 are operable to execute one or more of the following steps.

Referring to FIG. 6A, at step 601, the ride share client 184 installed in the ride share vehicle 123 acquires GPS data (e.g., DSRC-compliant GPS data) of the ride share vehicle 123 from a GPS unit (e.g., the DSRC-compliant GPS unit 170) of the ride share vehicle 123.

At step 603, the ride share client 184 of the ride share vehicle 123 constructs a V2X wireless message that includes the GPS data (e.g., the DSRC-compliant GPS data) of the ride share vehicle 123 and digital data that uniquely identifies the ride share vehicle 123 (e.g., a first vehicle ID). For example, the V2X wireless message is a BSM. The ride share client 198 installed in the ride share vehicle 123 constructs the BSM that includes, among other things: (1) the DSRC-compliant GPS data; and (2) the first vehicle ID.

At step 605, the ride share client 184 transmits the V2X wireless message. For example, the ride share client 184 causes the V2X radio 143 of the communication unit 145 installed in the ride share vehicle 123 to begin transmitting (via broadcast) the V2X wireless message (e.g., the BSM) via any form of V2X communications.

At step 607, the user device 110 of the ride share passenger receives the V2X wireless message, and then the ride share assistant 199 of the user device 110 retrieves the GPS data (e.g., the DSRC-compliant GPS data) of the ride share vehicle 123 and the first vehicle ID from the V2X wireless message.

At step 608, the ride share assistant 199 of the user device 110 discerns that the V2X wireless message is relevant to a ride share event associated with the user device 110 and the ride share vehicle 123 is a vehicle designated to execute the ride share event by comparing the first vehicle ID with a second vehicle ID stored in the vehicle ID database 128.

For example, the ride share assistant 199 installed on the user device 110 includes the vehicle ID database 128. The vehicle ID database 128 includes digital data (e.g., the second vehicle ID) that identifies the identity of the ride share vehicle 123 which is designated to pick up the ride share passenger. The ride share assistant 199 compares the first vehicle ID to the second vehicle ID. If the first vehicle ID matches the second vehicle ID (e.g., the first vehicle ID is identical to the second vehicle ID), the ride share assistant 199 discerns that this particular V2X wireless message is relevant to the ride share event which occurs beginning when the driver of the ride share vehicle 123 agreed to pick up the ride share passenger using the ride share vehicle 123.

At step 609, the ride share assistant 199 of the user device 110 retrieves GPS data of the user device 110 from the GPS unit 270.

At step 611, the ride share assistant 199 of the user device 110 provides an instruction to capture a real-time image of a real-life environment associated with the ride share passenger. For example, the ride share assistant 199 instructs the ride share passenger to activate the user device 110 to capture an image of the ride share passenger's environment (e.g., the ride share assistant 199 instructs the ride share passenger to hold the user device 110 up to capture an image of the ride share passenger's environment; the user device 110 is a pair of smart glasses, and the ride share assistant 199 instructs the ride share passenger to blink the eyes so that the pair of smart glasses is activated to capture an image of the ride share passenger's environment; or the user device 110 is another wearable device such as a smart watch, a bracelet, a ring, or a necklace, etc., and the ride share assistant 199 instructs the ride share passenger to press a button or touch a screen of the wearable device so that a camera in the wearable device is activated to capture an image of the ride share passenger's environment, etc.). For example, the ride share assistant 199 causes the display 114 to depict a graphic including this instruction.

Referring to FIG. 6B, at step 613, the ride share assistant 199 of the user device 110 controls a camera of the user device 110 to capture the real-time image of the real-life environment. For example, the ride share assistant 199 causes the camera of the user device 110 operated by the ride share passenger to capture one or more real-time images of the environment of the ride share passenger. The one or more images are described by the camera data. The display 114 of the user device 110 does not yet display the one or more images captured by the camera. The following steps 614-619 take place in a matter of a fraction of a second so that the image display process seems correct to the ride share passenger when he/she views the display 114 of the user device 110.

At step 614, the ride share assistant 199 of the user device 110 receives the camera data describing the real-time image from the camera.

At step 615, the ride share assistant 199 of the user device 110 controls one or more sensors to capture sensor data that describes an orientation of the display 114 of the user device 110.

At step 617, the ride share assistant 199 of the user device 110 receives the sensor data from the one or more sensors.

At step 619, the ride share assistant 199 of the user device 110 generates augmented graphical data based on one or more of the GPS data (e.g., the DSRC-compliant GPS data) of the ride share vehicle 123, the GPS data of the user device 110, the camera data and the sensor data.

At step 621, the ride share assistant 199 of the user device 110 controls the display 114 of the user device 110 to present the augmented graphical data so that an augmented version of the real-time image is displayed to highlight the position of the ride share vehicle 123 in the real-life environment.

Optionally, at step 623, the ride share assistant 199 of the user device 110 transmits a V2X wireless message indicating that the ride share vehicle 123 is highlighted on the display 114 of the user device 110 to the ride share application 184.

Figure 7A:
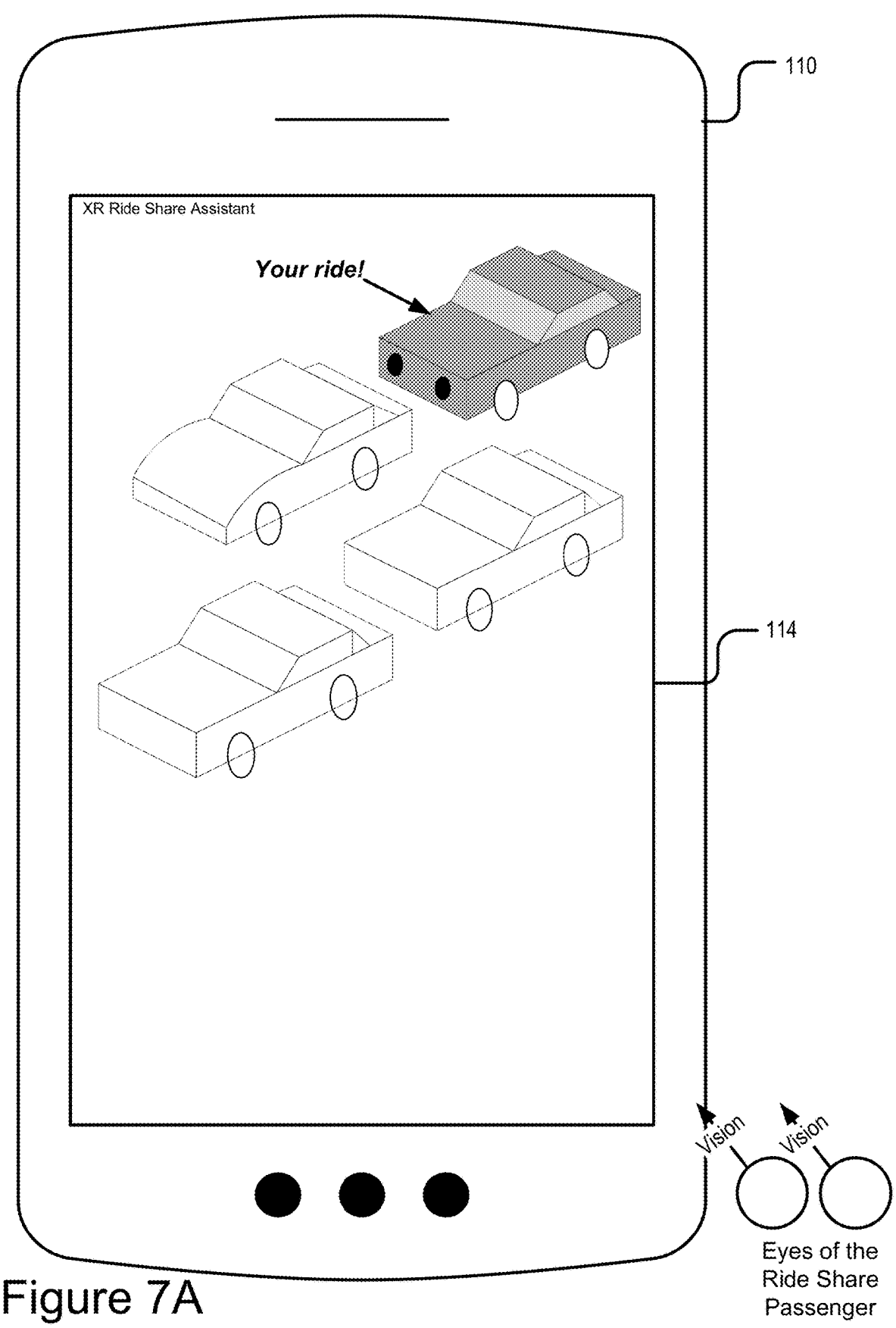
FIG. 7A is a graphical representation illustrating an example augmented version of an image that highlights a location of a ride share vehicle in a real-life environment according to some embodiments.

FIG. 7A is a graphical representation illustrating an example augmented version of an image that highlights a location of a ride share vehicle in a real-life environment according to some embodiments. In some embodiments, the ride share passenger holds up the user device 110 to capture an image of the real-life environment using a camera sensor of the user device 110. Here, the captured real-life environment includes four vehicles, and one of the four vehicles is the ride share vehicle. The image captured by the camera sensor is modified to highlight a location of the ride share vehicle. The display 114 of the user device 110 depicts AR/VR/MR content depicting the real-life environment with an emphasis on the location of the ride share vehicle. For example, the ride share vehicle is shaded in the depicted real-life environment and a text overlay "Your ride!" is also placed next to the highlighted ride share vehicle.

Figure 7B:
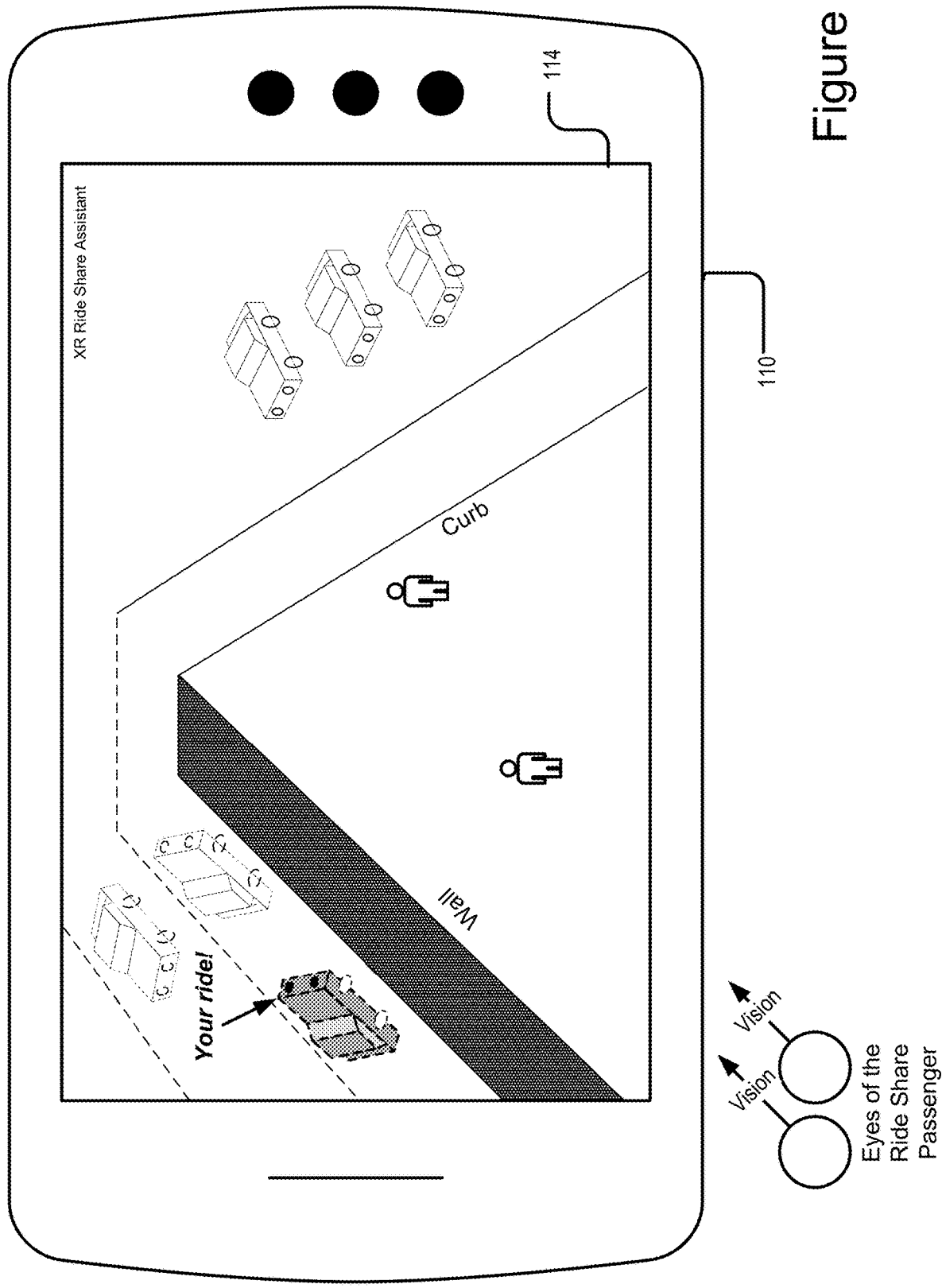
FIG. 7B is a graphical representation illustrating another example augmented version of an image that highlights a location of a ride share vehicle in a real-life environment according to some embodiments.

FIG. 7B is a graphical representation illustrating another example augmented version of an image that highlights a location of a ride share vehicle in a real-life environment according to some embodiments. In some embodiments, the ride share passenger holds up the user device 110 to capture an image of the real-life environment using a camera sensor of the user device 110. Here, a field of view of the camera sensor is blocked by a wall while the ride share vehicle is coming from the other side of the wall. That is, there is no line of sight between the camera sensor and the ride share vehicle.

The ride share assistant 199 installed in the user device 110 may receive a V2X wireless message described by V2X data from the ride share vehicle, where the V2X data includes GPS data of the ride share vehicle and sensor data describing a current roadway environment of the ride share vehicle. The ride share assistant 199 may generate a sub-image that depicts the ride share vehicle in its actual location (e.g., a dashed-line portion displayed on the display 114) based on the GPS data of the ride share vehicle and the sensor data describing the current roadway environment of the ride share vehicle. The ride share assistant 199 combines the sub-image with the captured image depicting the real-life environment (e.g., a solid-line portion displayed on the display 114) to form an augmented version of the captured image. The display 114 presents the augmented version of the captured image to the ride share passenger so that the ride share passenger can easily locate the ride share vehicle even if the ride share vehicle is not yet in line of sight.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   receiving, by a user device, a Vehicle-to-Everything (V2X) wireless message transmitted by a ride share vehicle and including V2X data describing the ride share vehicle and a first vehicle identifier (ID) that uniquely identifies the ride share vehicle;
   retrieving a second vehicle ID that uniquely identifies a vehicle designated to execute a ride share event associated with the user device from a vehicle ID database;
   responsive to the first vehicle ID matching the second vehicle ID, determining that the ride share vehicle is designated to execute the ride share event associated with the user device;
   determining that the ride share vehicle is within a communication range of the user device, but the ride share vehicle is not within a line-of-sight of the user device;
   generating augmented graphical data based on the V2X data, wherein the augmented graphical data describes an augmented version of an image captured by the user device and depicts a real-life environment that superimposes a representation of the ride share vehicle on top of an obstacle that blocks a light-of-sight view of the ride share vehicle, wherein the augmented version highlights a position of the ride share vehicle; and
   presenting the augmented graphical data on the user device so that the ride share vehicle is more easily located in the real-life environment.

2. The method of claim 1, wherein the representation of the ride share vehicle on top of the obstacle is illustrated with dashed lines around the ride share vehicle.

3. The method of claim 1, wherein the V2X data includes Global Positioning System (GPS) data of the ride share vehicle, the method further comprising:
   retrieving GPS data of the user device;
   retrieving camera data describing the image that depicts the real-life environment; and
   generating the augmented graphical data based on the GPS data of the ride share vehicle, the GPS data of the user device and the camera data.

4. The method of claim 1, wherein the image is a real-time image captured by a camera sensor of the user device.

5. The method of claim 1, wherein the augmented graphical data includes one of augmented-reality content, virtual-reality content and mixed-reality content, and the ride share vehicle on the augmented version of the image is augmented by computer-generated perceptual information.

6. The method of claim 1, further comprising:
   updating the augmented graphical data as an orientation of a display of the user device changes.

7. The method of claim 1, wherein the V2X wireless message is a basic safety message and the first vehicle ID is a temporary identification.

8. The method of claim 1, wherein the first vehicle ID and the second vehicle ID are temporary unique identifiers.

9. The method of claim 1, wherein the augmented graphical data further includes an arrow and text identifying the ride share vehicle.

10. The method of claim 1, wherein the V2X wireless message is selected from a group that consists of: a Basic Safety Message; a Long-Term Evolution (LTE) message; a LTE-V2X message; a 5G-V2X message; and a millimeter wave message.

11. The method of claim 1, wherein the ride share vehicle provides a ride share service to a user of the user device and the augmented graphical data assists the user to locate the ride share vehicle and receive the ride share service.

12. A system for a user device comprising:
   a processor; and
   a non-transitory memory storing computer code which, when executed by the processor, causes the processor to:
      receive a Vehicle-to-Everything (V2X) wireless message transmitted by a ride share vehicle and including V2X data describing the ride share vehicle and a first vehicle identifier (ID) that uniquely identifies the ride share vehicle;
      retrieve a second vehicle ID that uniquely identifies a vehicle designated to execute a ride share event associated with the user device from a vehicle ID database;
      responsive to the first vehicle ID matching the second vehicle ID, determine that the ride share vehicle is designated to execute the ride share event associated with the user device;
      determine that the ride share vehicle is within a communication range of the user device, but the ride share vehicle is not within a line-of-sight of the user device;
      generate augmented graphical data based on the V2X data, wherein the augmented graphical data describes an augmented version of an image captured by a user device and depicts a real-life environment that superimposes a representation of the ride share vehicle on top of an obstacle that blocks a light-of-sight view of the ride share vehicle, wherein the augmented version highlights a position of the ride share vehicle; and
      present the augmented graphical data on the user device so that the ride share vehicle is more easily located in the real-life environment.

13. The system of claim 12, wherein the representation of the ride share vehicle on top of the obstacle is illustrated with dashed lines around the ride share vehicle.

14. The system of claim 12, wherein the V2X data includes Global Positioning System (GPS) data of the ride share vehicle and the computer code, when executed by the processor, causes the processor further to:
   retrieve GPS data of the user device;
   retrieve camera data describing the image that depicts the real-life environment; and
   generate the augmented graphical data based on the GPS data of the ride share vehicle, the GPS data of the user device and the camera data.

15. The system of claim 12, wherein the image is a real-time image captured by a camera sensor of the user device.

16. The system of claim 12, wherein the augmented graphical data includes one of augmented-reality content, virtual-reality content and mixed-reality content, and the ride share vehicle on the augmented version of the image is augmented by computer-generated perceptual information.

17. The system of claim 12, wherein the computer code, when executed by the processor, causes the processor further to:
   retrieve sensor data describing an orientation of a display of the user device; and generate the augmented graphical data further based on the sensor data.

18. A computer program product for a user device comprising a non-transitory memory storing computer-executable code that, when executed by a processor, causes the processor to:

receive a Vehicle-to-Everything (V2X) wireless message transmitted by a ride share vehicle and including V2X data describing the ride share vehicle and a first vehicle identifier (ID) that uniquely identifies the ride share vehicle;

retrieve a second vehicle ID that uniquely identifies a vehicle designated to execute a ride share event associated with the user device from a vehicle ID database;

responsive to the first vehicle ID matching the second vehicle ID, determine that the ride share vehicle is designated to execute the ride share event associated with the user device;

determine that the ride share vehicle is within a communication range of the user device, but the ride share vehicle is not within a line-of-sight of the user device;

generate augmented graphical data based on the V2X data, wherein the augmented graphical data describes an augmented version of an image captured by a user device and depicts a real-life environment that superimposes a representation of the ride share vehicle on top of an obstacle that blocks a light-of-sight view of the ride share vehicle, wherein the augmented version highlights a position of the ride share vehicle; and present the augmented graphical data on the user device so that the ride share vehicle is more easily located in the real-life environment.

19. The computer program product of claim 18, wherein the representation of the ride share vehicle on top of the obstacle is illustrated with dashed lines around the ride share vehicle.

20. The computer program product of claim 18, wherein the V2X data includes Global Positioning System (GPS) data of the ride share vehicle and the computer-executable code, when executed by the processor, causes the processor further to:

retrieve GPS data of the user device;

retrieve camera data describing the image that depicts the real-life environment; and generate the augmented graphical data based on the GPS data of the ride share vehicle, the GPS data of the user device and the camera data.

* * * * *